US009286075B2

(12) United States Patent
Smittle et al.

(10) Patent No.: US 9,286,075 B2
(45) Date of Patent: Mar. 15, 2016

(54) OPTIMAL DEALLOCATION OF INSTRUCTIONS FROM A UNIFIED PICK QUEUE

(75) Inventors: Matthew B. Smittle, Allen, TX (US); Robert T. Golla, Round Rock, TX (US)

(73) Assignee: Oracle America, Inc., Redwood Shores, CA (US)

( * ) Notice: Subject to any disclaimer, the term of this patent is extended or adjusted under 35 U.S.C. 154(b) by 1679 days.

(21) Appl. No.: 12/571,200

(22) Filed: Sep. 30, 2009

(65) Prior Publication Data

US 2011/0078697 A1   Mar. 31, 2011

(51) Int. Cl.
*G06F 9/38* (2006.01)

(52) U.S. Cl.
CPC .............. *G06F 9/3836* (2013.01); *G06F 9/384* (2013.01); *G06F 9/3838* (2013.01); *G06F 9/3842* (2013.01); *G06F 9/3851* (2013.01); *G06F 9/3857* (2013.01)

(58) Field of Classification Search
None
See application file for complete search history.

(56) References Cited

U.S. PATENT DOCUMENTS

| | | | |
|---|---|---|---|
| 4,931,904 A | 6/1990 | Yiu | |
| 5,210,680 A | 5/1993 | Scheibler | |
| 5,247,427 A | 9/1993 | Driscoll et al. | |
| 5,289,340 A | 2/1994 | Yoshifuji | |
| 5,402,312 A | 3/1995 | Kinjo et al. | |
| 5,805,849 A | 9/1998 | Jordan et al. | |
| 5,896,542 A | 4/1999 | Iadonato et al. | |
| 5,991,163 A | 11/1999 | Marconi et al. | |
| 6,058,019 A | 5/2000 | Graves et al. | |
| 6,112,019 A * | 8/2000 | Chamdani et al. | 712/214 |
| 6,212,621 B1 | 4/2001 | Mahalingaiah | |
| 6,334,182 B2 * | 12/2001 | Merchant et al. | 712/214 |
| 6,388,879 B1 | 5/2002 | Otaguro et al. | |
| 6,421,215 B1 | 7/2002 | Bushue | |
| 6,422,876 B1 | 7/2002 | Fitzgerald et al. | |
| 6,452,789 B1 | 9/2002 | Pallotti et al. | |
| 6,485,309 B2 | 11/2002 | Edholm | |
| 6,538,881 B1 | 3/2003 | Jeakins et al. | |
| 6,542,362 B2 | 4/2003 | Lajara et al. | |
| 6,574,695 B1 | 6/2003 | Mott et al. | |

(Continued)

OTHER PUBLICATIONS

Hennessy et al. "Computer Organization and Design: The Hardware/ Software Interface" Morgan Kaufmann Publishers, Inc., Second Edition 1998, pp. 351-377.*

(Continued)

*Primary Examiner* — Jacob A Petranek
(74) *Attorney, Agent, or Firm* — Rory D. Rankin; Meyertons, Hood, Kivlin, Kowert & Goetzel, P.C.

(57) ABSTRACT

Systems and methods for efficient out-of-order dynamic deallocation of entries within a shared storage resource in a processor. A processor comprises a unified pick queue that includes an array configured to dynamically allocate any entry of a plurality of entries for a decoded and renamed instruction. This instruction may correspond to any available active threads supported by the processor. The processor includes circuitry configured to determine whether an instruction corresponding to an allocated entry of the plurality of entries is dependent on a speculative instruction and whether the instruction has a fixed instruction execution latency. In response to determining the instruction is not dependent on a speculative instruction, the instruction has a fixed instruction execution latency, and said latency has transpired, the circuitry may deallocate the instruction from the allocated entry.

20 Claims, 11 Drawing Sheets

(56) References Cited

U.S. PATENT DOCUMENTS

| | | |
|---|---|---|
| 6,574,748 B1 | 6/2003 | Andress et al. |
| 7,050,307 B2 | 5/2006 | Doblar et al. |
| 7,296,106 B2 | 11/2007 | Doblar et al. |
| 7,401,206 B2 | 7/2008 | Hetherington et al. |
| 8,255,671 B2* | 8/2012 | Beaumont-Smith .. G06F 9/3838 712/217 |
| 2003/0005263 A1* | 1/2003 | Eickemeyer et al. ......... 712/218 |
| 2003/0182540 A1* | 9/2003 | Burky et al. ................ 712/225 |
| 2009/0259827 A1 | 10/2009 | Ramirez et al. |
| 2010/0058035 A1* | 3/2010 | Abernathy et al. ........... 712/217 |
| 2010/0250902 A1* | 9/2010 | Abernathy et al. ........... 712/216 |
| 2010/0257339 A1* | 10/2010 | Brown et al. ................. 712/214 |

OTHER PUBLICATIONS

"Reorder Buffer", ECEN 6253 Advanced Digital Computer Design, Mar. 9, 2005, 2 pages.

"Virtual Midplane Realizes Ultrafast Card Interconnects"; Electronic Design (ED Online ID # 1771); Dec. 9, 2002; Michael Fowler; Copyright © 2004; Penton Media, Inc.

* cited by examiner

OPTIMAL DEALLOCATION OF INSTRUCTIONS FROM A UNIFIED PICK QUEUE

BACKGROUND OF THE INVENTION

1. Field of the Invention

This invention relates to computing systems, and more particularly, to efficient out-of-order dynamic deallocation of instructions from a shared resource in a processor.

2. Description of the Relevant Art

Modern microprocessors typically have increasing pipeline depth in order to support higher clock frequencies and increased microarchitectural complexity. Also, out-of-order (o-o-o) issue and execution of instructions helps hide instruction latencies. Compiler techniques for automatic parallelization of software applications contribute to increasing instruction level parallelism (ILP). These techniques aim to increase the number of instructions executing in a processor in each clock cycle, or pipe stage. Although, these techniques attempt to increase the utilization of processor resources, many resources are unused in each pipe stage.

In addition to exploiting ILP, techniques may be used to perform two or more tasks simultaneously on a processor. A task may be a thread of a process. Two or more tasks, or threads, being simultaneously executed on a processor may correspond to a same process or different processes. This thread level parallelism (TLP) may be achieved by several techniques. Chip multiprocessing (CMP) includes instantiating two or more processor cores, or cores, within a microprocessor. However, CMP may make it difficult to achieve scalability. Also, instantiated cores consume a large amount of on-chip real estate and power consumption.

A core may be configured to simultaneously process instructions of two or more threads. A processor with multithreading enabled may be treated by the operating system as multiple logical processors instead of one physical processor. The operating system may try to share the workload among the multiple logical processors, or virtual processors. Fine-grained multithreading processors hold hardware context for two or more threads, but execute instructions from only one thread in any clock cycle. This type of processor switches to a new thread each cycle. A coarse-grained multithreading processor only switches to issue instructions for execution from another thread when the current executing thread causes a long latency events such as a page fault or a load miss to main memory. To further increase TLP, a simultaneous multithreading (SMT) processor is configured to issue multiple instructions from multiple threads per clock cycle.

SMT processors increase throughput by multiplexing shared resources among several threads. Typically, SMT processors are superscalar, out-of-order machines. The set of instructions processed in a single cycle by a particular pipe stage may not all be from the same thread. The pipeline may be shared "horizontally" as well as "vertically". Buffers, or shared storage resources, such as the instruction queue, reorder buffer, pick queue or instruction scheduler, and store queue, for example, generally contain instructions from multiple threads simultaneously.

A key aspect of SMT processor design is the division of shared pipeline resources among threads. When multiple independent threads are active, assigning them to separate physical partitions can simplify the design and mitigate communication penalties. Many modern designs utilize static partitioning of shared storage resources, such as an instruction queue that stores recently fetched instructions, the pick queue for storing decoded and renamed instructions to be assigned to execution units, and the reorder buffer, for example. However, SMT's efficiency comes from the processor's ability to share execution resources dynamically across threads.

Intuitively, the flexibility of dynamic resource allocation provides the potential for higher efficiency than static partitioning. For example, peak system performance may increase by both picking instructions from a dynamically allocated shared storage resource, such as a pick queue, to fully utilize other shared resources, such as execution units, and subsequently, deallocating picked instructions from the shared storage resource as soon as possible to allow other instructions to utilize the entries of the shared storage resource. For example, if picked instructions are deallocated from the pick queue as soon as possible, then instructions in an earlier pipe stage may be allowed to be candidates for instruction picking.

It is noted that deallocation is not automatic, such as one or more stages of a pipelined execution unit. To be deallocated, these picked instructions may have to satisfy conditions based upon an instruction type, which may be indicated by an opcode, dependencies on other instructions, the behavior of speculative instructions, a number of levels of logic that may fit in a single clock cycle, a number of entries in a shared storage resource, and other. It may be difficult to choose an appreciable number of picked instructions of a total number of instructions allocated in entries of a shared storage resource in order to maintain high peak system performance.

In view of the above, efficient methods and mechanisms for efficient out-of-order dynamic deallocation of entries within a shared storage resource in a processor are desired.

SUMMARY OF THE INVENTION

Systems and methods for efficient out-of-order dynamic deallocation of entries within a shared storage resource in a processor are contemplated. In one embodiment, a processor comprises a unified pick queue that includes an array configured to dynamically allocate an entry of a plurality of entries for a decoded and renamed instruction. This instruction may correspond to any available active threads supported by the processor. Each entry is configured to store age information and dependency information relative to other decoded instructions. Also, each entry is configured to store status information such as whether or not the instruction has been picked for subsequent issue and execution.

Control circuitry for the pick queue may determine whether or not a picked instruction of an allocated entry is dependent on a speculative instruction and whether the picked instruction has a fixed latency. The circuitry may assert corresponding deallocation control signals in a predetermined pipe stage, in response to determining the picked instruction is not dependent on a speculative instruction and the picked instruction the has a fixed latency. The predetermined pipe stage may be a first pipe stage L stages after the pick pipe stage, wherein L is the fixed latency. Therefore, an instruction may be deallocated from the pick queue prior to completion of its operation and a broadcast of a corresponding result.

These and other embodiments will become apparent upon reference to the following description and accompanying drawings.

Figure 1:
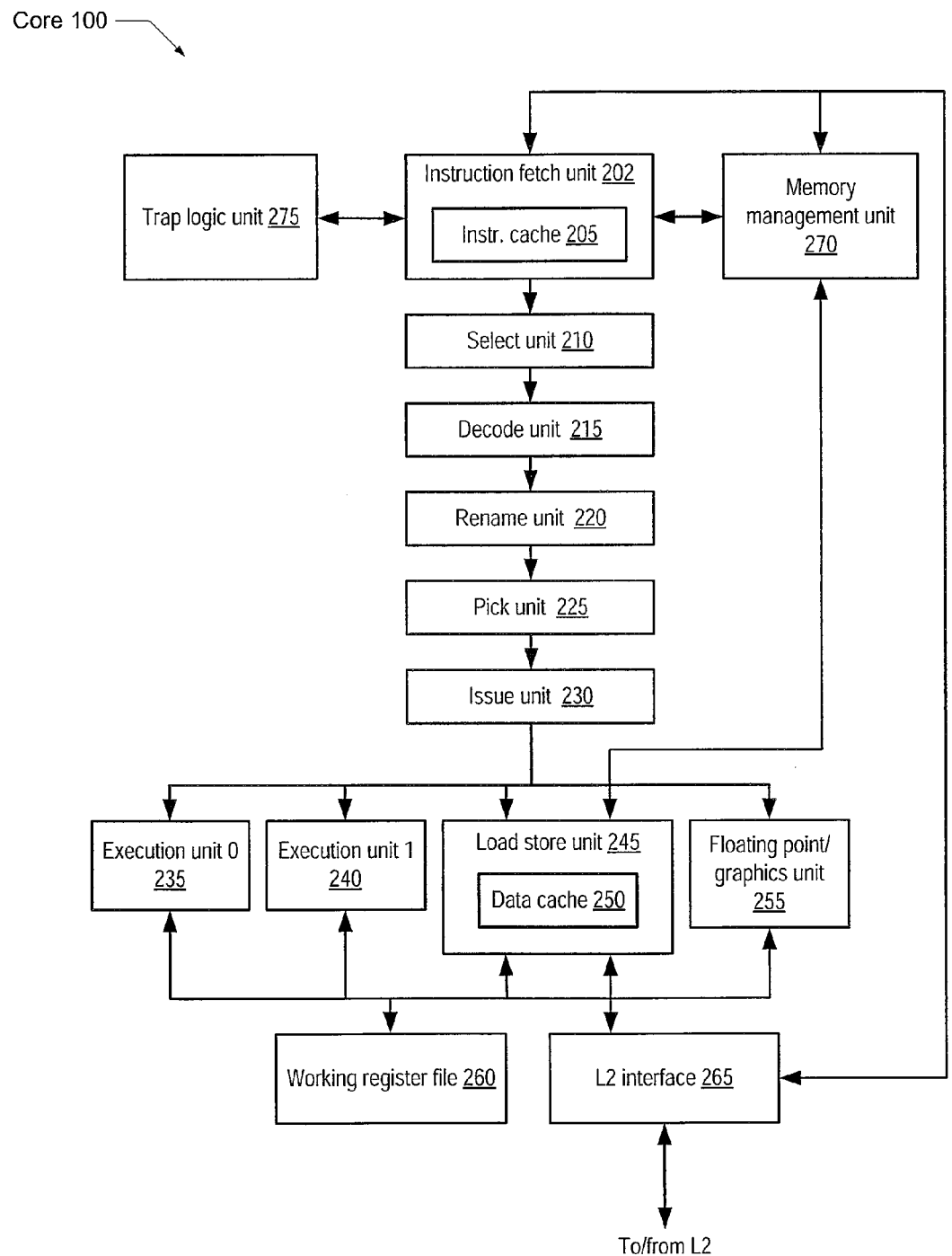
FIG. 1 is a generalized block diagram illustrating one embodiment of a processor core configured to perform dynamic multithreading.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, one embodiment of a processor core 100 configured to perform dynamic multithreading is shown. Processor core 100 may utilize conventional processor design techniques such as complex branch prediction schemes, out-of-order execution, and register renaming techniques. Core 100 may include circuitry for executing instructions according to a predefined instruction set. For example, the SPARC instruction set architecture (ISA) may be selected. Alternatively, the x86, x86-64, Alpha, PowerPC, MIPS, PA-RISC, or any other instruction set architecture may be selected. Generally, processor core 100 may access a cache memory subsystem for data and instructions. Core 100 may contain its own level 1 (L1) and level 2 (L2) caches in order to reduce memory latency. Memory latency may be defined as the elapsed time between a request contents stored in memory, such as a cache line, and the time the contents are available to core 100. The elapsed time may be measured in terms of clock cycles. In an alternative embodiment, these cache memories may be coupled to processor cores 100 in a backside cache configuration or an inline configuration, as desired.

In one embodiment, processor core 100 may support execution of multiple threads. Multiple instantiations of a same processor core 100 that is able to concurrently execute multiple threads may provide high throughput execution of server applications while maintaining power and area savings. A given thread may include a set of instructions that may execute independently of instructions from another thread. For example, an individual software process may consist of one or more threads that may be scheduled for execution by an operating system. Such a core 100 may also be referred to as a multithreaded (MT) core. In one embodiment, core 100 may be configured to concurrently execute instructions from a variable number of threads, such as up to eight concurrently executing threads.

In one embodiment, core 100 may be configured for multithreaded, out-of-order execution. More specifically, in one embodiment, core 100 may be configured to perform dynamic multithreading. Generally speaking, under dynamic multithreading, the execution resources of core 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be input/output (I/O)-bound rather than processor-bound—completion of an individual request may need I/O accesses (e.g., to relatively slow memory, network, or storage devices) that dominate the overall time needed to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to dynamically allocate processor resources in a manner that flexibly adapts to workloads that vary along the continuum described above. In one embodiment, core 100 may be configured to implement fine-grained multithreading, in which core 100 may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, core 100 may be configured to efficiently process workloads that depend more on concurrent thread processing than individual thread performance.

In one embodiment, core 100 may also be configured to implement out-of-order processing, speculative execution, register renaming and/or other features that improve the performance of processor-dependent workloads. Moreover, core 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation look aside buffers, page walk resources).

In the illustrated embodiment, core 100 includes an instruction fetch unit (IFU) 202 that includes an L1 instruction cache 205. IFU 202 is coupled to a memory management unit (MMU) 270, L2 interface 265, and trap logic unit (TLU) 275. IFU 202 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a L1 data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit (IFU) 202 may be configured to provide instructions to the rest of core 100 for execution. In one embodiment, IFU 202 may be configured to select a thread to be fetched, fetch instructions from instruction cache 205 for the selected thread and buffer them for downstream processing, request data from an L2 cache (not shown) in response to instruction cache misses, and predict the direction and target of control transfer instructions (e.g., branches). In some embodiments, IFU 202 may include a number of data structures in addition to instruction cache 205, such as an instruction translation lookaside buffer (ITLB), instruction buffers, and/or structures configured to store state that is relevant to thread selection and processing.

In one embodiment, virtual to physical address translation may occur by mapping a virtual page number to a particular physical page number, leaving the page offset unmodified. Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that needs further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur.

In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc. In one embodiment, TLU 275 may be configured to flush all instructions from the trapping thread from any stage of processing within core 100, without disrupting the execution of other, non-trapping threads.

In the illustrated embodiment, L2 interface 265 may be configured to provide a centralized interface to the L2 cache associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache during a given execution cycle.

In one embodiment, during each execution cycle of core 100, IFU 202 may be configured to select one thread that will enter the IFU processing pipeline. Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 202, instructions may actually be fetched for the selected thread. To perform the fetch, in one embodiment, IFU 202 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 202 may store the retrieved instructions within buffers for use by later stages of the instruction pipeline. If there is a cache miss, IFU 202 may coordinate retrieval of the missing cache data from an L2 cache. In some embodiments, IFU 202 may also be configured to prefetch instructions into instruction cache 205 before the instructions are actually requested to be fetched.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 202 may be configured to predict the direction and target of CTIs (or, in some embodiments, a subset of the CTIs that are defined for an ISA) in order to reduce the delays incurred by waiting until the effect of a CTI is known with certainty.

Through the operations discussed above, IFU 202 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining the load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or FGU instructions with a long instruction execution latency.

Instruction execution latency may be dependent on a corresponding execution unit or functional unit. As used herein, instruction execution latency may be defined as the elapsed time between the time a first instruction begins execution and the time a dependent second instruction may begin execution. The dependent second instruction may use a result produced by the first instruction as a source operand, and, therefore, may wait until the source operand is available to begin execution. In this manner, the amount of time the second dependent instruction waits may equal the instruction execution latency of the first instruction. In one embodiment, the latency may be measured in units of clock cycles.

In one embodiment, instruction execution latency may be measured in terms of the depth of a corresponding execution pipeline. In this embodiment, the instruction execution latency value may correspond to the number of clock cycles before a result of a first instruction may be used by a dependent second instruction. For example, an integer arithmetic operation may be completed within a single clock cycle and the corresponding instruction execution latency may be measured as 1 clock cycle. A second dependent instruction may then begin execution 1 clock cycle after the first instruction began execution.

In another embodiment, the instruction execution latency may be measured as the number of intervening clock cycles between the time the first instruction begins execution and the time the second dependent instruction begins execution. Therefore, with data forwarding of results, in one embodiment, the instruction execution latency may be measured as one clock cycle less than the depth, or number of clock cycles, of a corresponding execution pipeline. In this embodiment, the instruction execution latency value may correspond to the number of intervening clock cycles before the result of the first instruction may be used by a dependent second instruction. For example, an integer arithmetic operation may be completed within a single clock cycle. The corresponding instruction execution latency may be measured as 0 clock cycles. There are 0 intervening clock cycles before the result of an integer arithmetic operation may be used by a dependent second instruction.

It is appreciated that regardless of the manner an instruction execution latency is measured, this measured value may be used to determine timing dependencies between instructions. This timing dependency information may be used in control logic to determine which clock cycle or pipe stage of a pipeline to pick an instruction for issue, to deallocate an instruction from a queue, or other. In the remainder of this description, as used herein, an instruction execution latency may be referred to as the number of clock cycles between the time a first instruction begins execution and the time a dependent second instruction may begin execution. Therefore, in the above example of a single-cycle integer arithmetic operation, the corresponding instruction execution latency may be measured as 1 clock cycle. This instruction execution latency may be referred to as a fixed latency, since the measured value does not vary and may be predetermined.

Likewise, in another example, a pipelined floating-point execution unit may perform the operation of a floating-point addition or subtraction instruction. In one embodiment, this floating-point execution unit may perform the operations in 3 clock cycles. Therefore, the floating-point addition and subtraction instructions have an instruction execution latency of 3 clock cycles. This value does not vary and may be predetermined. The instruction execution latency for these instructions is a fixed latency.

Other instructions may not have a fixed latency. Each time these other instructions execute, the timing of the production of their respective results may not be predetermined. These other instructions may be referred to as nondeterministic instructions. One example may include a load instruction that misses the data cache and is experiencing a cache line fill transaction. Another example may be a floating-point divide instruction wherein the generation of the result is dependent on the source data. Also, an instruction such as a floating-point divide may not be pipelined, which makes the instruction nondeterministic.

Deterministic instructions may be divided into two or more categories based on instruction execution latency values. Instructions in a same category may have a same instruction execution latency. In one embodiment, this categorization may lead to control logic being configured to determine whether a particular instruction has a fixed latency, and, if so, what is the value of this fixed latency. The control logic may be configured to determine when to pick the particular instruction for issue, when to deallocate the particular instruction from a queue, or other.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multi-cycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard.

Load store unit 245 may be configured to process data memory references, such as integer and floating-point load and store instructions and other types of memory reference instructions. LSU 245 may include a data cache 250 as well as logic configured to detect data cache misses and to responsively request data from an L2 cache. In one embodiment, data cache 250 may be configured as a set-associative, write-through cache in which all stores are written to an L2 cache regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Regarding the pick queue in the pick unit 225, in order to maintain high performance, the selection of multiple decoded and renamed instructions to send to the issue unit 230 occurs in a single pipeline stage. As described above, a pick queue within the pick unit 225 may store a number of decoded and renamed instructions as well as information about the relative age and status of the stored instructions. During a single clock cycle Pick pipeline stage, instructions may be picked from a number of instructions stored in the pick queue within the pick unit 225. Picked instructions are sent to the issue unit 230.

Logic within the pick unit 225 may split the instruction pick operation into two tasks, wherein a first task is responsible for dataflow ordering, such as instruction dependencies. A subsequent second task is responsible for resource allocation and age tracking. A dependency cycle formed between logic to perform the first task which identifies ready instructions, and logic to perform the second task which selects a set of ready instructions for execution, forms a tight loop which is well known as critical to performance as described by E. Borch, et al. Loose loops sink chips, in Proceedings of HPCA-8, February 2002.

Typically, during the first task, which is responsible for dataflow ordering, an instruction is considered ready if it is not dependent on any other instructions in the pick queue. In order to determine an instruction stored in the pick queue is now able to obtain source operands from completed older (in program order) instructions, a broadcast of the results may be used to notify younger (in program order) dependent instructions. Generally, a broadcast observes results being generated and notifies waiting dependent instructions that are now ready for execution. Further details of the pick operation, including both first and second tasks, are provided shortly.

Figure 2A:
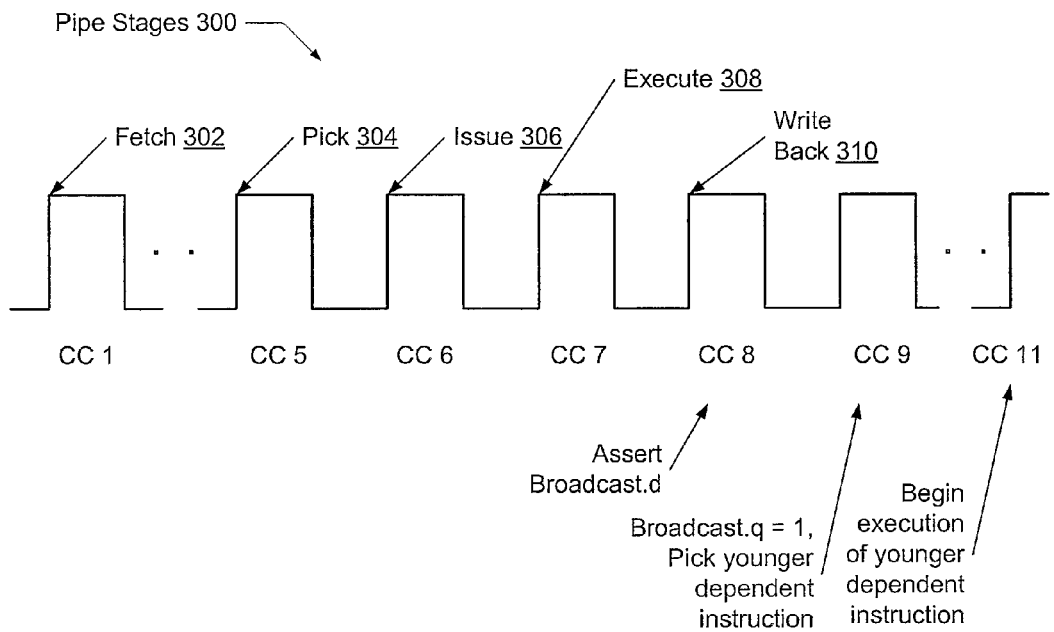
FIG. 2A is a generalized block diagram illustrating one embodiment of pipeline stages of a processor core.

Referring now to FIG. 2A, one embodiment of pipeline stages 300 of a processor core with signals indicating generation of results is shown. Here, in the embodiment shown, each pipeline stage, such as Pick 304 is shown as a single clock cycle. In this example, pipe stage Pick 304 occurs in clock cycle (CC) 5. Generally speaking, pipeline stages Fetch 302, Issue 306, Execute 308, and Write Back 310 may each be implemented with multiple clock cycles. One or more pipeline stages not shown or described may be present in addition to pipeline stages 302-310. For example, decoding, renaming, and other pipeline stages which may be present between Fetch 302 and Pick 304 are not shown for ease of illustration.

Also, there may be multiple execution pipelines, such as one for integer operations, one for floating-point operations, a third for memory operations, another for graphics processing and/or cryptographic operations, and so forth. The embodiment of pipe stages 300 shown in FIG. 2A is for illustrating the indication of generated results to younger (in program order) dependent instructions. The embodiment shown is not meant to illustrate an entire processor pipeline.

In one embodiment, when results are generated by older (in the pipeline) instructions, such as the completion of pipe stage Execute 308, a broadcast of this completion may occur. In one embodiment, the result tags may be broadcast. For example, during the Write Back 310 pipe stage, the results of an integer add instruction may be presented on a results bus. Control logic may detect a functional unit has completed its task (such as in pipe stage Write Back 310). Accordingly, certain control signals may be asserted, such as signal broadcast.d, to indicate to other processor resources that this particular instruction has results available for use. For example, the control signal broadcast.d may be routed to an input of a flip-flop, wherein the output of the flip-flop is an asserted broadcast.q in the subsequent pipe stage.

This broadcast signal (broadcast.d) and storage in a flip-flop is provided as an example. In other embodiments, other control signals may be used in addition to or in place of this broadcast signal. Other control signals may include a corresponding valid signal and results tags routed to comparators within the pick queue, a corresponding valid signal and decoded pick queue entry number input to a word line driver, or otherwise. In the example shown, the signaling of available results occurs in pipe stage Write Back 310 in clock cycle 8. This assertion occurs following a last execution clock cycle of an execution pipeline. In this example, the execute pipeline (Execute 308) is a single pipe stage shown in clock cycle 7.

In the clock cycle following the pipe stage Write Back 310, clock cycle 9, younger (in program order) instructions may verify their source operands are ready, since a results broadcast has been conveyed. The logic within the pick unit 225 may pick these younger instructions that were previously waiting for the results. In one embodiment, a single cycle pipe stage, Issue 306, follows for these younger instructions and then they may begin execution in clock cycle 11.

It is noted that the timing may differ in other embodiments. For example, both the broadcast of results and the pick of instructions may occur in the pipe stage Write Back 310 in clock cycle 8. Regardless, the broadcast may be gated by the actual completion of an older (in the pipeline) instruction's operation. Additionally, the earliest start of execution of a younger (in program order) instruction may be dependent on the number of pipe stages between the pipe stage Pick 304 and the pipe stage Execute 308. In this example, there is only a single cycle Issue 306 pipe stage. However, processors may have deep pipelines, and latencies may increase significantly.

In order to improve throughput and to begin the execution of younger (in program order) dependent instructions at an earlier time, a prediction may be made regarding the completion of a corresponding older (in program) order instruction. Alternatively, a reduction may be made in the number of pipe stages between Pick 304 and Execute 308. However, it is noted that modern microarchitectures may have increasing complexity used to achieve higher performance and a reduction in pipeline depth may reduce performance. On the other hand, a prediction may increase performance when the prediction is correct. For example, when an instruction is picked in pipe stage Pick 304, the number of clock cycles until a result is produced by this particular instruction at Write Back 310 may be determinate. In the example of FIG. 2A, an integer arithmetic instruction picked in pipe stage Pick 304 in clock cycle 5 may be safely predicted to produce a result in pipe stage Write Back 310 in clock cycle 8. Rather than wait to generate a broadcast of some type in pipe stage Write Back 310 in clock cycle 8, a prediction signal may be generated earlier that allows younger dependent instructions to be picked earlier. In this manner, an efficient pipe stage overlap may exist between the producing of the results by an older instruction and the use of the results by a younger dependent instruction.

Figure 2B:
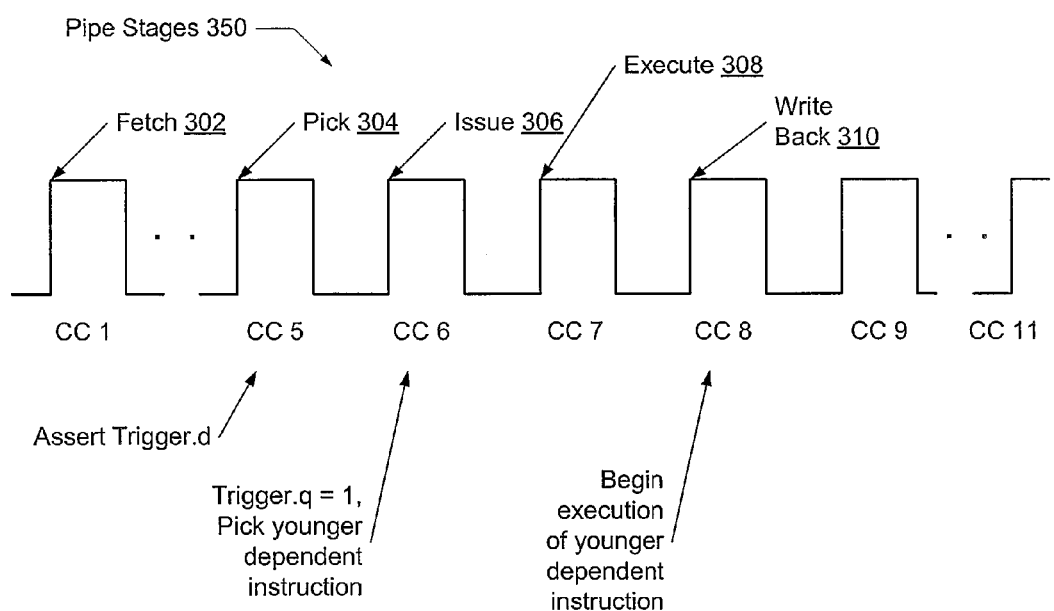
FIG. 2B is a generalized block diagram illustrating another embodiment of pipeline stages of a processor core.

Turning now to FIG. 2B, one embodiment of pipeline stages 350 of a processor core with signals indicating a predicted generation of results is shown. Pipe stages with the same functionality as pipe stages in FIG. 2A are numbered identically. In one embodiment, when an instruction is picked, such as in pipe stage Pick 304 in clock cycle 5, a prediction is made regarding the clock cycle the corresponding results will be generated. In one example, the instruction may be an integer arithmetic operation that computes a result in one execution clock cycle. In order to overlap the generation of the result in pipe stage Write Back 310 in clock cycle 8 with the beginning of pipe stage Execute 308 in clock cycle 7 of a younger dependent instruction, a prediction signal is asserted in clock cycle 6. Therefore, the younger dependent instruction may be picked in clock cycle 6 and issued in clock cycle 7. Then this younger dependent instruction may begin execution in clock cycle 8 when needed results are generated. In this example, the younger dependent instruction is able to begin execution in clock cycle 8 versus clock cycle 11 of the example in FIG. 2A.

This prediction signal, labeled "Trigger" in FIG. 2B, may be asserted in pipe stage Pick 304 (CC 5) and input to a flip-flop. Alternatively, a value corresponding to this Trigger signal (e.g., a bit) may be stored in a matrix or a queue. In pipe stage Pick 304 corresponding to clock cycle 5, it may be determined the Trigger bit corresponding to the picked older integer arithmetic instruction should be set. However, since the determination of which instructions to pick does not occur until late in the clock cycle (again, this may be the critical path of the processor), the determination to set the corresponding Trigger bit may occur late in clock cycle 5.

An entry, or an instruction, in the pick queue may be considered ready if it is not dependent on any other instructions in the pick queue. In addition, as shown in FIG. 2B in clock cycle 6, the corresponding asserted Trigger bit (Trigger.q) may be used to determine a younger dependent instruction is both ready and eligible to be picked. Therefore, an instruction in the pick queue may be considered ready if (1) it is not dependent on any other instructions in the pick queue, or (2) instructions it is dependent on have been picked and triggered. In order to be picked, an instruction may be the oldest ready instruction for a corresponding hardware resource. Further explanation is provided below.

One task of an instruction pick operation corresponding to dataflow ordering may be to provide a prediction, such as the above discussed Trigger bit. This Trigger bit may be used to drive just-in-time execution of a subsequent younger dependent instruction. Each instruction that produces a result may be referred to as a producer. Each younger dependent instruction with respect to the producer may be referred to as a consumer. Control logic corresponding to the producer may determine the latency between the clock cycle the producer is picked and the clock cycle the Trigger bit is asserted. This determination may be performed at any of a variety of times. For example, in one embodiment, the determination may be made in any clock cycle between the clock cycle the producer is decoded and the clock cycle the producer is picked.

For example, referring to FIG. 2B, a producer may be an integer arithmetic instruction with single-cycle instruction execution. A determination may be made between a decode pipe stage not shown (subsequent pipe stage Fetch 302), and pipe stage Pick 304. This determination may find a latency of 1 cycle for this instruction in this particular pipeline. Therefore, the Trigger bit may be set in the same cycle as the pipe stage Pick 304. In other examples, an instruction may have two or more execution cycles. Therefore, the determined latency may be greater. For example, again referring to FIG. 2B, if it is determined a particular instruction has a known 3 cycle instruction execution, rather than a single-cycle instruction execution, then the Trigger bit may be set in clock cycle 7, rather than in clock cycle 5. Clock cycles 7, 8, and 9 may now correspond to the 3 cycles for the instruction execution.

Figure 3:
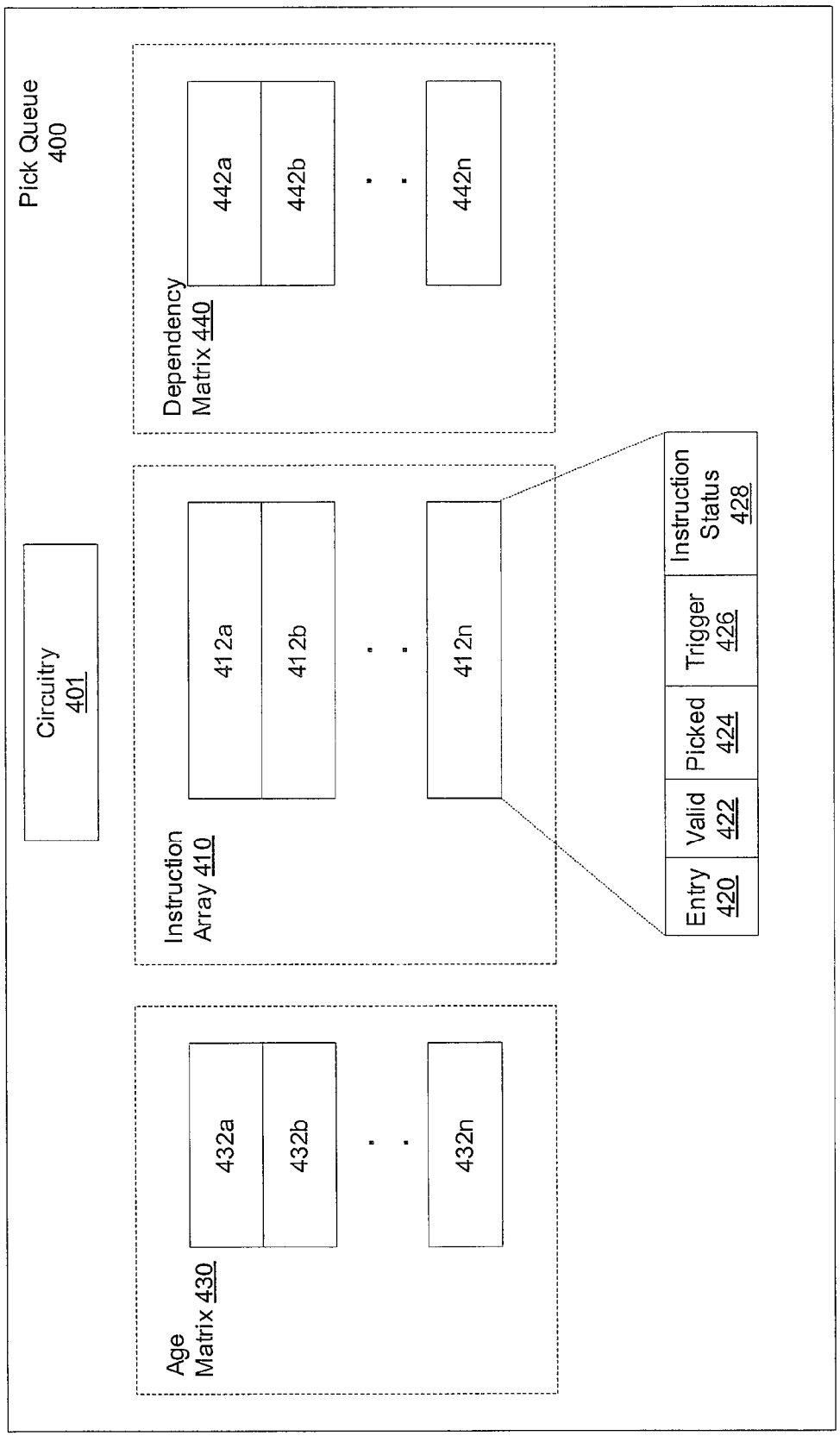
FIG. 3 is a generalized block diagram illustrating one embodiment of the entries of a pick queue.

Turning now to FIG. 3, one embodiment of a pick queue 400 configured to hold instructions that may be picked for execution is shown. In one embodiment, pick queue (PQ) 400 holds decoded (and possibly renamed) instructions in processor core 100. The buffered instructions may include micro-operations, or micro-ops, if core 100 is configured to support such operations. In one embodiment, the pick queue 400 includes an instruction array 410, age matrix 430, a dependency matrix 440, and circuitry 401 configured to control various aspects of the pick queue 400. Instruction array 410 may be used for maintaining status and characteristics of decoded and renamed instructions. Age matrix 430 may be used for hardware resource allocation and instruction age tracking. Dependency matrix 440 may be used for dataflow ordering.

A single entry of the pick queue 400 may comprise corresponding entries in each of the instruction array 410, age matrix 430, and dependency matrix 440. For example, a first entry in the pick queue 400 may comprise entries 432a, 412a, and 442a. A second entry in the store queue 400 may comprise entries 432b, 412b, and 442b, and so on. In general, the pick queue 400 may be responsible for scheduling multiple instructions each clock cycle for execution.

One task of an instruction pick operation regarding dataflow ordering utilizes the instruction array 410 and the dependency matrix 440. The instruction array 410 in FIG. 3 comprises a plurality of entries 412, wherein each entry 412 may correspond to a decoded and renamed instruction. As used herein, elements referred to by a reference numeral followed by a letter may be collectively referred to by the numeral alone. For example, entries 412a-412n may be collectively referred to as entries 412. In one embodiment, each entry 412 includes an entry number 420, a valid field 422, a picked field 424, a trigger field 426, and an instruction status field 428. Although the fields are shown in this particular order, other combinations are possible and other or additional fields may be utilized as well. The bits storing information for the fields 420-428 may or may not be contiguous. Similarly, the arrangement of instruction array 410, age matrix 430, and dependency matrix 440 array may use other placements for better design trade-offs.

In one embodiment, the entry number 420 corresponds to the position of an entry in the pick queue 400, wherein entry 0 may be configured to be at the top of instruction array 410 or at the bottom depending on logic preferences. The entry field 420 may be implied rather than an actual stored number. In one embodiment, pick queue entries may be dynamically allocated in a previous (e.g., renaming) pipe stage. The valid field 422 for a queue entry is updated with a value to indicate a valid entry when the entry is allocated. As will be discussed further, a pick queue entry may be deallocated upon instruction completion if, for example, no load/store hazards exist for the corresponding pick queue entry. The valid field 422 may be reset to a value indicating an empty entry when the entry is deallocated.

Picked field 424 may be used to indicate a corresponding instruction has been picked. Also, the picked field 424 may be used to ensure the corresponding instruction is not subsequently re-picked. Between a first clock cycle when a particular instruction is picked and a second clock cycle when the particular entry is deallocated, the particular instruction is not re-picked due to a set value in the picked field 424. In various embodiments, between the first and second clock cycles, the particular instruction may be disqualified as being ready during pipe stage Pick 304. The trigger field 426 may allow a younger dependent instruction to be picked prior to an older instruction that it depends on completing its operation as shown in FIG. 2B. The status field 428 may contain additional information regarding the corresponding instruction.

Figure 4:
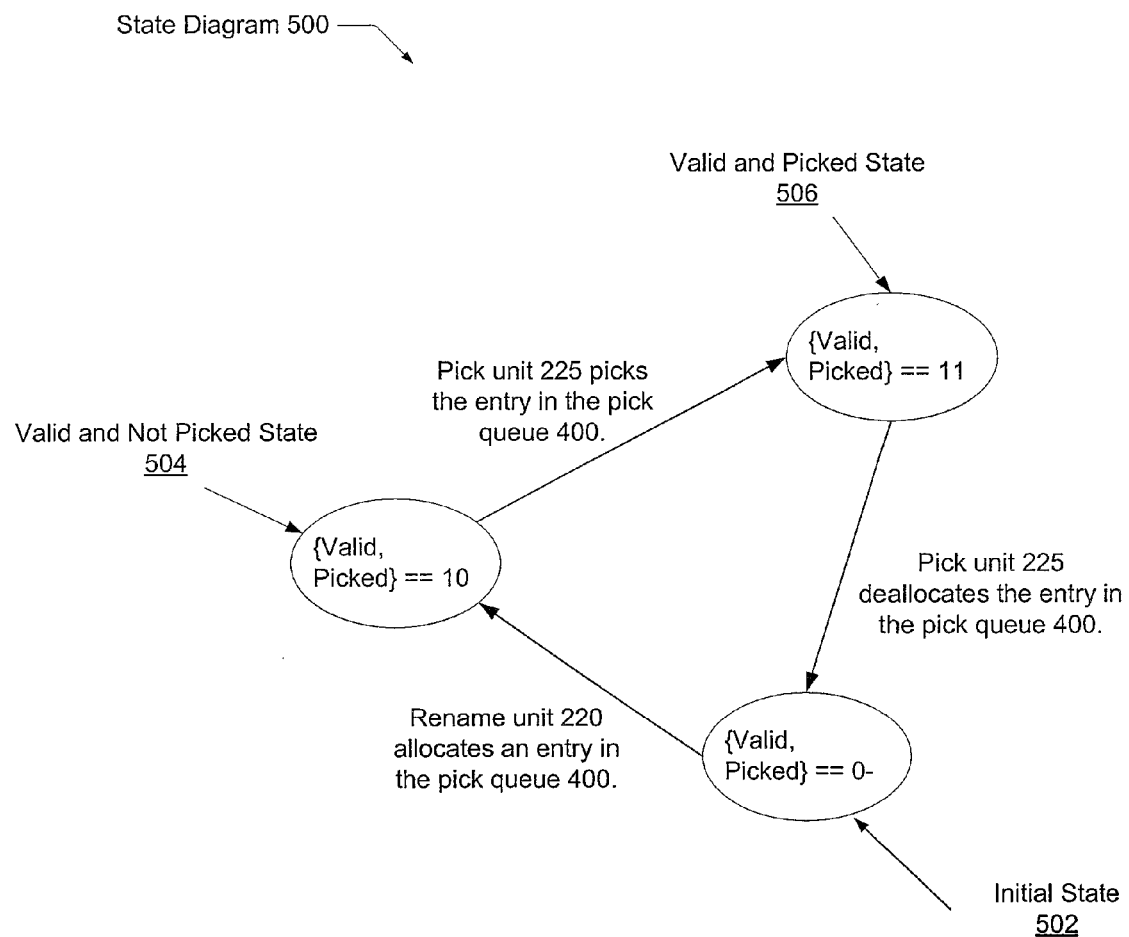
FIG. 4 is a generalized state diagram illustrating one embodiment of the assertion of the valid and picked signals corresponding to a decoded instruction in the pick queue.

Referring to FIG. 4, one embodiment of a state diagram 500 for the valid field 422 and the picked field 424 is shown. In one embodiment, the fields 422 and 424 are each single bits with an initial reset value of logic 0. Those skilled in the art will appreciate other embodiments for representing states and reset values are possible, and such embodiments are contemplated. An initial state 502 comprises the Boolean value {0-} for the two fields. The initial state 502 corresponds to an entry in the pick queue 400 that is not allocated. In one embodiment, a rename unit 220 allocates an entry in the pick queue 400. Accordingly, state diagram 500 transitions to state 504 which corresponds to a valid and not picked state. Here, the Boolean value for the two fields is shown as {10}.

Subsequently, when the pick unit 225 picks the particular entry in the pick queue 400, state diagram 500 transitions to state 506 which corresponds to a valid and picked state. The corresponding Boolean value for the two fields is {11}. In this state, the corresponding instruction may not be re-picked due to instruction-ready logic that receives this Boolean value as an input and disqualifies the corresponding instruction. In one embodiment, the instruction-ready logic is implemented with dynamic logic to be further described shortly. When the corresponding instruction has completed execution and has no existing impediment to deallocation (e.g., it has no load or store operation hazard), pick unit 225 may deallocate the instruction from the pick queue 400. In this case, state diagram 500 returns to initial state 502.

Returning back to FIG. 3, as noted the trigger field 426 may allow a younger dependent instruction to be picked prior to an older instruction that it depends on to complete its operation as shown in FIG. 2B. In one embodiment, the pick unit 225 may set the trigger field 426 to indicate a corresponding picked instruction has produced results or is going to produce results at a deterministic clock cycle in at least one of two ways. These two ways may be referred to as internal triggers and external triggers. Internal triggers are generated within the pick unit 225 when the timing of result generation is known. One example is a load instruction hit case. External triggers are generated when the timing of result generation is not known. One example of an external trigger is a load instruction miss case that waits for the load store unit to complete a cache line fill transaction.

Figure 5:
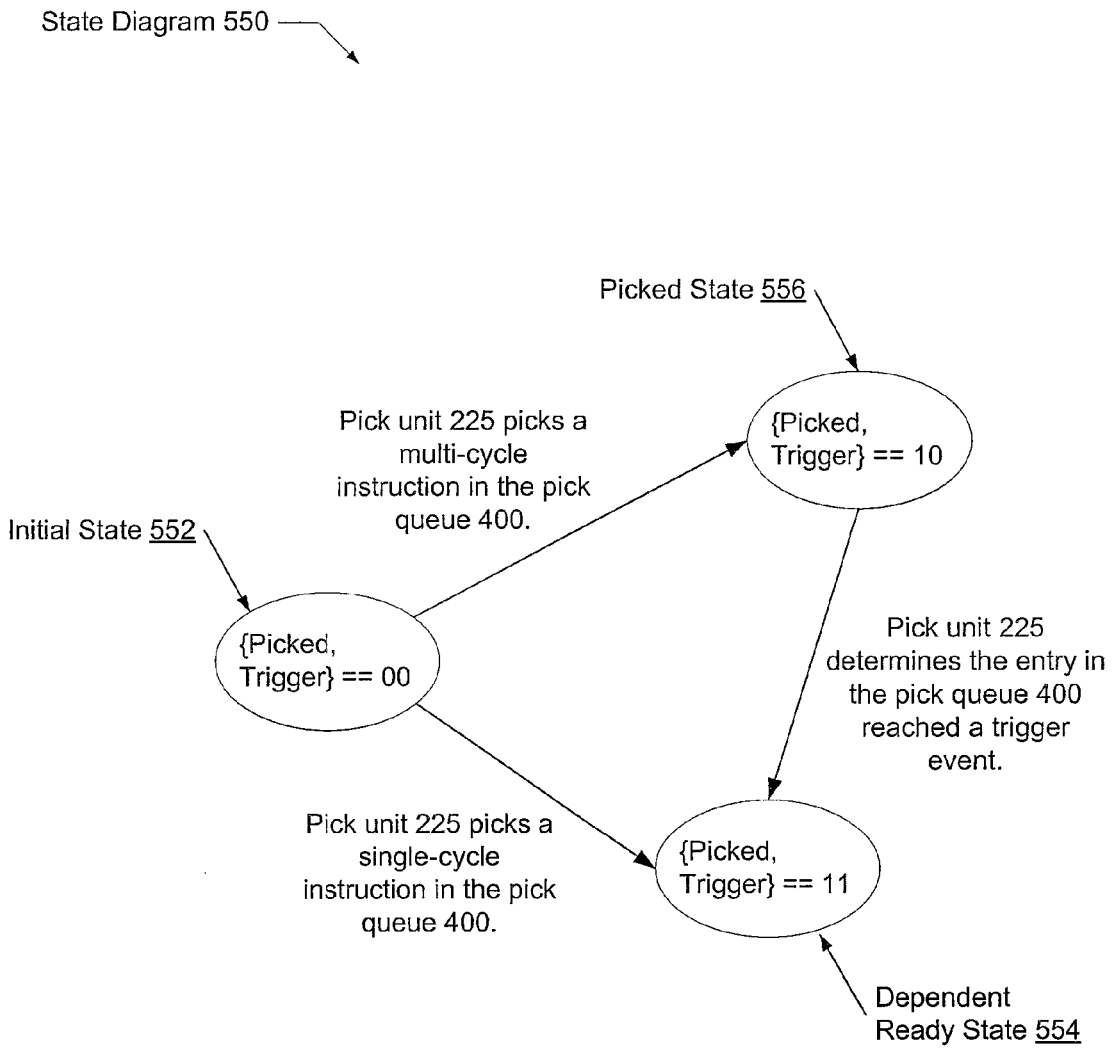
FIG. 5 is a generalized state diagram illustrating one embodiment of the assertion of the picked and trigger signals corresponding to a decoded instruction in the pick queue.

FIG. 5 depicts one embodiment of a state diagram 550 for the picked field 424 and the trigger field 426. In the embodiment shown, the fields 424 and 426 are each a single bit with an initial reset value of logic 0. An initial state 552 comprises the Boolean value {00} for the two fields. The initial state 552 corresponds to a valid entry in the pick queue 400 that is not yet picked and triggered. As an example, in one embodiment the pick unit 225 picks an entry in the pick queue 400 that stores a single-cycle instruction. Accordingly, state diagram 550 transitions to the state 554 that corresponds to a dependent ready state. Here, the Boolean value for the two fields is {11}. Any younger instructions dependent on this particular instruction may now be determined to be ready and possibly picked. Alternatively, the pick unit 225 may pick an entry in the pick queue 400 that stores a multi-cycle instruction. Accordingly, state diagram 550 flows to state 556 that corresponds to a picked state. Here, the Boolean value for the two fields is {10}. Any younger instructions dependent on this particular instruction may not be determined to be ready and possibly picked. When the pick unit 225 determines the entry in the pick queue 400 reaches a trigger event, which may be a predetermined number of clock cycles after the multi-cycle instruction was picked, the state diagram 550 may transition to dependent ready state 554.

In one embodiment, the pick unit 225 may handle multi-cycle instructions in the FGU 255 pipeline differently from multi-cycle load operations. Recall that an instruction in the pick queue may be considered ready if it is not dependent on any other instructions in the pick queue or if instructions it is dependent on have been picked and triggered. The former case applies to multi-cycle FGU 255 instructions. The latter case applies to multi-cycle load instructions. A multi-cycle FGU 255 instruction that has been picked may generate results at a predetermined clock cycle. Multi-cycle FGU 255 instructions may include integer and floating-point (FP) instructions executed on the FGU 255 pipeline. Unless a pipeline flush occurs, such as for an exception, latency for the generation of the result of the multi-cycle FGU 255 instruction is known. Therefore, a corresponding entry within the pick queue 400 may be deallocated between the cycle the multi-cycle FGU 255 instruction is picked and the cycle of the generation of the corresponding result.

The deallocation described above may allow younger dependent instructions to be picked and begin execution just-in-time to receive the corresponding generated result data of the multi-cycle FGU 255 instruction. In contrast, a multi-cycle load instruction is not deallocated from the pick queue 400 when it is picked. This load instruction may later miss in the data cache. Therefore, a multi-cycle load instruction utilizes the trigger field 426, and not deallocation from the pick queue 400, in order to allow younger dependent instructions to be picked and to begin execution just-in-time to receive the corresponding generated result data.

In one embodiment, the pick queue 400 supports the speculative pick and issue of certain instructions such as a load operation. For load instructions, the corresponding trigger bit 426 may be set a predetermined number of cycles after the load is picked. This predetermined number may be based on the assumption that the load instruction hits in the data cache.

The setting of this trigger bit 426 may allow younger dependent instructions to be subsequently picked. If the load instruction misses in the data cache, all of the corresponding dependent instructions may replay, or be re-picked by the pick queue 400 for execution at a later time, such as when the load miss data is returned from the memory subsystem. Upon detecting a load miss, the corresponding picked 424 and trigger 426 bits of the load instruction may be set to {1,0}. The corresponding picked 424 and trigger 426 bits of the dependent instructions may be set to {0,0}. In this state, the dependent instructions may not be picked to issue and execute since the original load instruction is picked and not yet triggered. Once the load miss completes, the corresponding fields 424 and 426 of the load instruction may be set to {1,1} allowing the dependent instructions to be possibly picked.

For certain cases such as data translation look-aside buffer (d-TLB) misses, it may be desirable to replay the load or store instruction that caused the TLB miss as well as any dependent instructions. In this case, the corresponding bits 424 and 426 of the original load or store instruction may be set to {0,0} upon completion of the d-TLB miss.

Returning to FIG. 3, the status field 428 may contain additional information regarding the corresponding instruction. One example is a stalled bit that when asserted prevents the corresponding entry from being picked. This stalled bit may be used to remove instructions from instruction pick consideration while allowing other instructions stored in the pick queue 400 to be considered for instruction pick for a given hardware resource.

The stalled bit allows the pick unit 225 to inject "holes" into the pipeline for execution units as required. In certain cases, the LSU 245 may need "holes" in order to service cache line fill transactions and complete load misses. In order to generate a "hole" for the LSU 245, the pick unit 225 may generate a 40-bit stalled mask for a 40-entry pick queue 400 during a prior clock cycle before the "hole" generation. Other mask and pick queue sizes other than 40 bits are possible and contemplated. This 40-bit stalled mask for a 40-entry pick queue 400 may have set bits for stored instructions in the pick queue 400 and for instructions being written to the pick queue 400 in the current cycle corresponding to particular hardware resources or a group of hardware resources, such as LSU 245 or a group of resources containing LSU 245.

This 40-bit mask may ensure no memory reference instruction will be picked the following cycle. The MMU 270 may generate a 3-cycle stall when it is reloading the data translation-lookaside-buffer (d-TLB). Also, the FGU 255 may need "holes" to be injected in order to finish long latency operations such as a divide operation. In this case, a stalled mask may be generated with logic 1's in locations of the mask corresponding to floating-point (FP) instructions in the pick queue 400. The generated results of these FP instructions may be for both instructions already stored in the pick queue 400 and for instructions being written to the pick queue 400 in the current cycle. Therefore, it may be ensured that no FGU instructions with a valid destination will be picked the following cycle. The described conditions and other contemplated conditions for stalls may be combined in a logical OR operation to produce a final stalled bit to be stored in the instruction status field 428.

Another example of information stored in the instruction status field 428 may be a single bit that is asserted when it is known the corresponding instruction is an instruction type that produces results in a single cycle. For example, it may be known that an integer arithmetic instruction is able to produce a result in a single execution clock cycle.

A third example of a sub-field within the instruction status field 428 may be an enable bit that enables the use of the trigger bit. This enabled bit may be used to avoid forwarding of results from a cryptographic operation. A resource tag corresponding to the instruction stored in the entry may be also held in the instruction status field 428.

In one embodiment, pick queue 400 may be implemented as a unified queue. As stated earlier, a processor core 100 comprising a pick queue 400 may be configured to perform dynamic multithreading. It may not be desirable to instantiate on-chip a separate pick queue 400 for each thread due to on-chip real estate constraints. Also, a single pick queue 400 divided evenly among the maximum number of supported threads, wherein the subdivisions incorporate static allocation, may be inefficient.

For example, if processor core 100 is configured to concurrently execute 8 threads and pick queue 400 has 40 total entries (or 40 entries 412, 40 entries 432, and 40 entries 442), then, in one embodiment, 5 pick queue entries support each thread. Alternatively, a separate 5-entry pick queue may exist for each thread. However, each of the 5 entries in these examples for a particular thread may not be fully utilized or may not be utilized at all, as the particular thread may not be scheduled with work. Another thread, on the other hand, may be utilizing all 5 of its pick queue entries and may need more in order to not experience stalls. Therefore, it may be more efficient and provide higher performance to use dynamic allocation of a unified pick queue 400. In one embodiment, a design tradeoff with dynamic allocation of pick queue entries is the entries do not provide an indication of an ordering among the instructions.

The purpose of maintaining dataflow ordering among the instructions stored in the pick queue 400 is to observe when results are generated and identify instructions that are ready for execution. In one embodiment, content addressable memories (CAMs) may be used within the pick queue to maintain dataflow ordering. The result tags, which may simply be a physical register number, of older (in the pipeline) instructions that have completed execution are broadcasted on a set of result buses, one for each functional unit with a writeback port. Each set of result buses may be connected to comparators, such as xnor gates, at each entry within the pick queue. These comparators allow instructions to determine if their sources match the results being generated. When all of an instruction's sources are ready, the instruction as a whole is considered ready. However, CAMs consume an appreciable amount of both on-chip real estate and electrical power.

In another embodiment, rather than use CAMs to broadcast results, a dependency matrix 440 such as that shown in FIG. 3 may be used. A dependency matrix 440 has one row and one column for every instruction in the pick queue 400. Each cell may hold one bit of state representing whether an instruction assigned to a particular row, or entry 442, is waiting on a dependency from an instruction assigned to a particular column. The bit vectors stored in rows 442 may be set via allocation comparators, which may place a logical high value in the row if the corresponding column produces a corresponding result tag. In one embodiment, as older (in the pipeline) instructions are deallocated from the pick queue 400, a corresponding column is cleared (i.e., set all bits in the column to a logic low value).

The deallocation of speculative instructions, such as load and store instructions, and dependent instructions of the speculative instructions may be handled differently from other instructions. For example, each store operation within processor core 100 may be considered to be a speculative operation in the sense that a miss to a data translation lookaside buffer (d-TLB) may arise during execution of the store instruction by the LSU 245. Similarly, each load operation within processor core 100 may be considered to be a speculative operation in the sense that a miss to the d-TLB, a miss to the data cache, or a read-after-write (RAW) data hazard may arise during execution of the instruction by the LSU 245. When a miss or hazard arises during execution of a load or a store instruction, the pick unit 225 may support various levels of replay capability for dependent instructions after the load instruction. The pick unit 225 may undo a predetermined number of instruction pick clock cycles and subsequently replay the dependent instructions. In one embodiment, independent instructions may not be replayed.

Due to load and store instruction speculation, corresponding entries 442 may not be immediately deallocated in the pick queue 400 once an instruction is picked. The picked bit 424 is used to ensure that the corresponding entry 442 is not re-picked between the cycle an instruction is picked and the cycle an instruction is deallocated from the pick queue 400. Younger dependent instructions in the pick queue 400 may not be picked unless the trigger bit 426 of the corresponding older (in program order) instruction is set.

Figure 6:
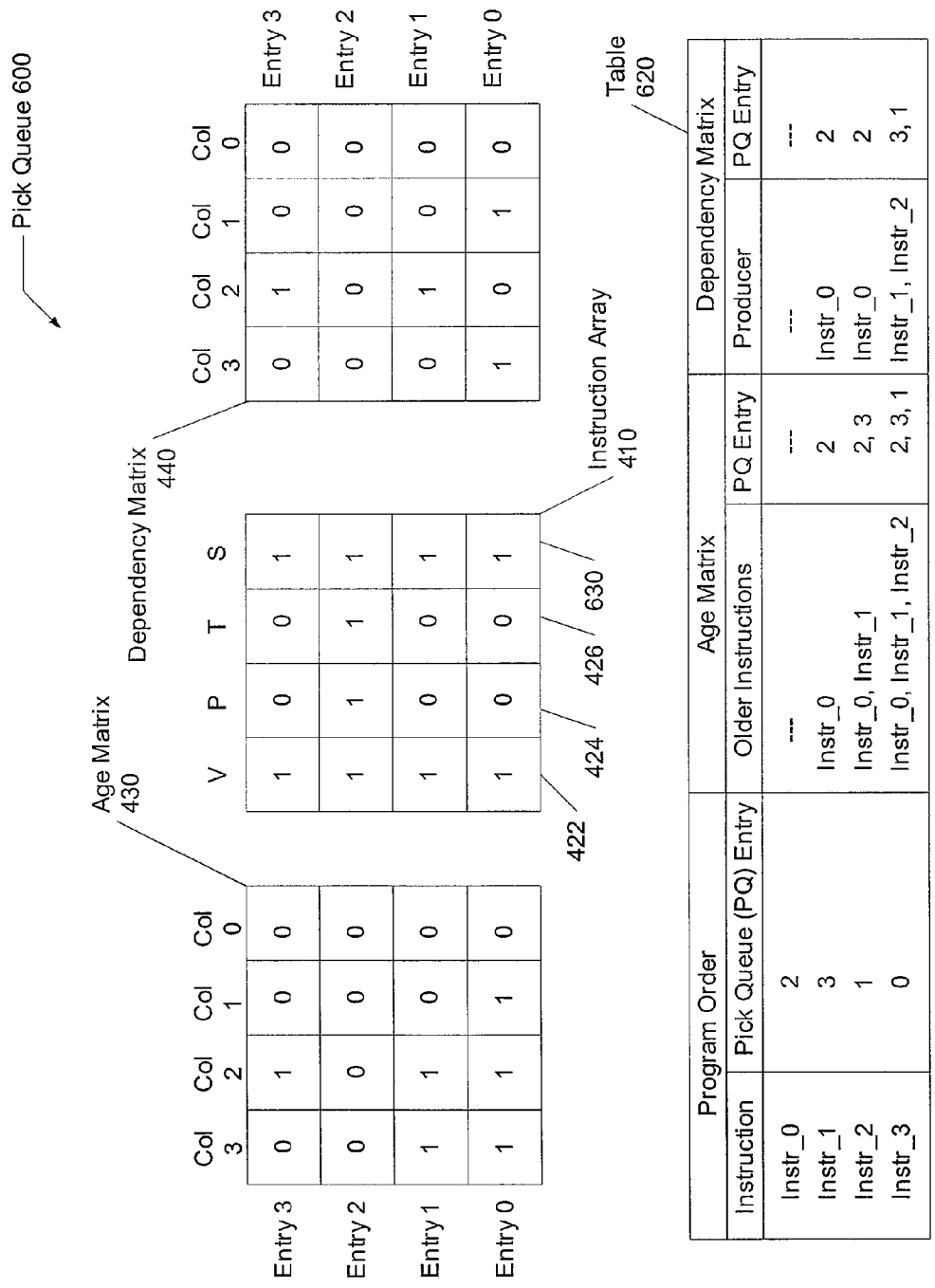
FIG. 6 is a generalized block diagram and table illustrating another embodiment of the entries of a pick queue.

Turning now to FIG. 6, another embodiment of a pick queue 600 demonstrating a sample usage is shown. Here, pick queue 600 has 4 entries. Each of an age matrix 430, an instruction array 410, and a dependency matrix 440 have 4 entries. Table 620 displays the program order of four computer program instructions and the pick queue 600 entry information.

In the age matrix 430, instructions older than a given instruction are stored as a logic value 1 in the corresponding column of the pick queue 600 entry for that instruction. For example, instruction 2 is mapped to entry 1 of the pick queue 600, which has bits set for entries 2 and 3 in the age matrix 430. These entries correspond to instruction 0 and instruction 1. Hence, instructions 0 and 1 are older than instruction 2. For simplicity, the information in Table 620 assumes that all instructions are assigned to the same slot. In practice, multiple slots may be active in the pick queue 600 at the same time. The age matrix 430 is maintained on a slot basis and is used to track the age relationships between all instructions on a slot basis. Bits set in the age vector for a given entry of the pick queue 600 may be instructions that are older than the respective instruction and also mapped to the same slot.

The dependency matrix 440 functions in a similar manner to the age matrix 430. For a given instruction, other instructions it depends on have a logic value 1 stored in the corresponding column of the pick queue 600 entry for that instruction. For example, instruction 2 is mapped to entry 1 of the pick queue 600, which has a logic value 1 stored in column 2. Column 2 corresponds to entry 2, which corresponds to instruction 0. Hence, instruction 2 is dependent on instruction 0. Instruction 2 may not be picked before instruction 0 is picked. Instruction array 410 holds the valid 422, picked 424, trigger 426, and single 630 fields for each of the four instructions.

Figure 7:
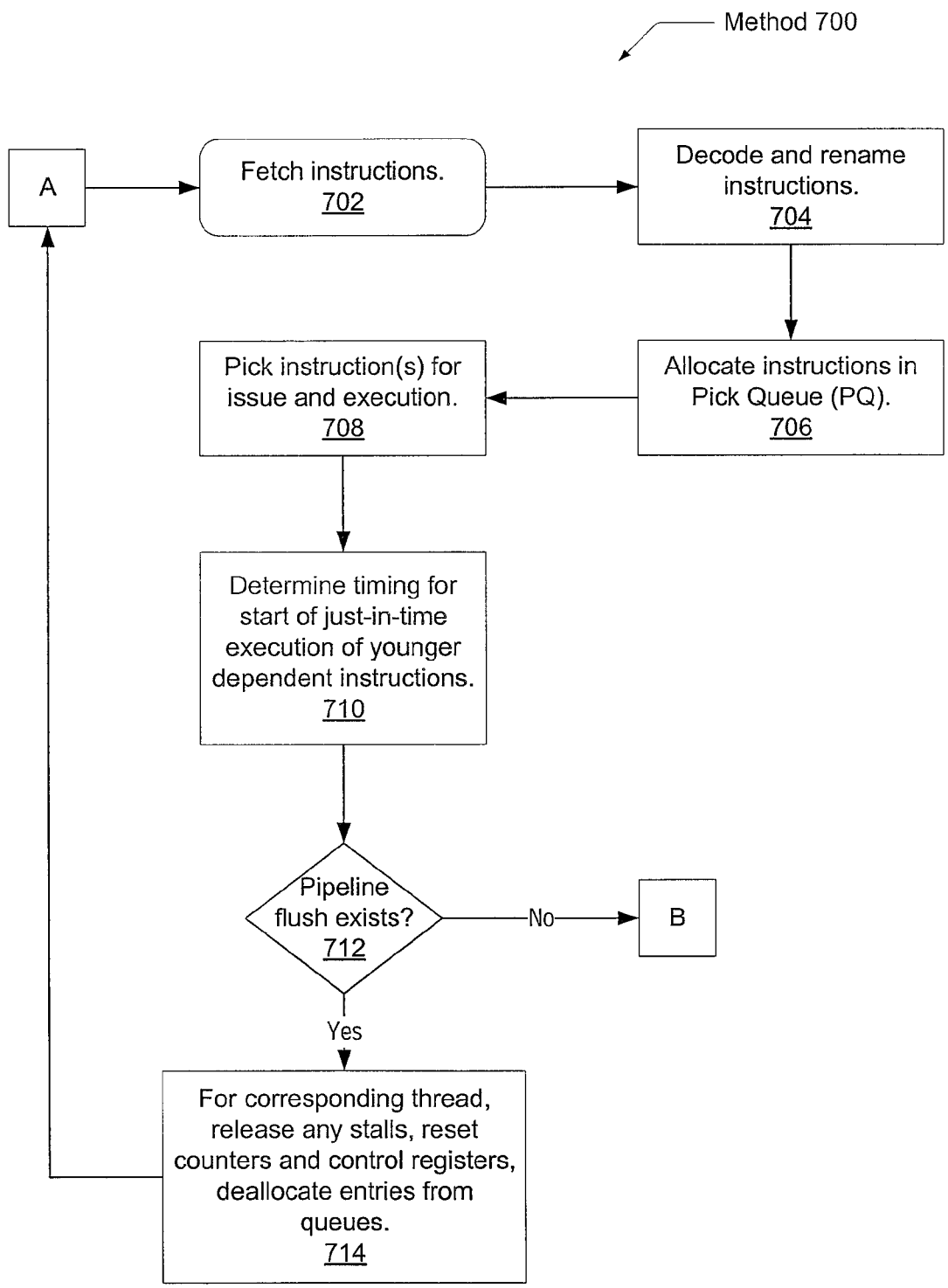
FIG. 7 is a generalized flow diagram illustrating one embodiment of a method for efficient out-of-order dynamic deallocation of entries from a shared storage resource in a processor.

Referring now to FIG. 7, one embodiment of a method 700 for efficient out-of-order dynamic deallocation of instructions from a shared storage resource in a processor is shown. In one embodiment, the shared storage resource is a pick queue within a processor core. The components embodied in the processor core 100 and pick queue 400 described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

A processor core 100 may be executing instructions of one or more software applications. In block 702, core 100 fetches instructions of one or more software applications. These fetched instructions are decoded and renamed in block 704. In block 706, the renamed instructions may be allocated in an out-of-order dynamically allocated shared resource such as pick queue 400. If the particular picked instruction is not dependent on a nondeterministic instruction, then in block 708, the particular instruction may wait for an indication to begin pipeline traversal, such as being picked in the pick queue 400, for just-in-time execution. A nondeterministic instruction may be an instruction wherein the clock cycle of the generation of the corresponding result is not known or able to be predetermined. An example is a load instruction that misses the data cache and is experiencing a cache line fill transaction. Another example is a floating-point divide instruction wherein the generation of the result is dependent on the source data. Also, an instruction such as a floating-point divide may not be pipelined, which makes the instruction nondeterministic.

One example of an indication to begin pipeline traversal, such as being picked in the pick queue 400, may be the series combination of the picked 424 and trigger bit 426 fields of a producer, wherein the particular instruction is a consumer. Also, this particular picked instruction may have received one or more indications that corresponding source operands are ready. Otherwise, a determination may be made regarding when the source operands will be ready for the particular instruction. The particular picked instruction may have waited for assigned hardware resources to become available. It is possible for the instruction to be delayed due to stall signals. In block 710, a determination is made regarding the particular instruction for the latency to be used for just-in-time execution of younger dependent instructions. This value may be used to assert a corresponding trigger bit 426 in a subsequent clock cycle.

Control flow of method 700 moves to block B if no pipeline flush exists for a corresponding thread (conditional block 712). A pipeline flush may be caused by a branch misprediction, a trap, a data cache miss to main memory, or other. In one embodiment, trap logic unit 275 conveys an indication of a pipeline flush for the corresponding thread. Otherwise, if a pipeline flush does exist for the corresponding thread (conditional block 712), then in block 714, corresponding counters and control registers are reset. For example, if a stall signal is asserted for the thread to be flushed, then this stall signal is deasserted. This thread may have an asserted associated stall signal due to allocating too many entries within the shared resource or the thread has been idle for too long within the shared resource. Corresponding control registers such as an idle time counter, a number of allocated entries register, and other registers may be reset to zero. Entries of a shared storage resource, such as the pick queue 400, may then be deallocated. Then instructions of other threads may utilize these freed entries in subsequent clock cycles. In one embodiment, the deallocation performed may occur simultaneously. Therefore, each entry of the pick queue 400, such as entries 432, 412, and 442 of FIG. 3, may be deallocated in a single clock cycle. As described above, the deallocation window could be the entire pick queue 400.

In one embodiment, an M-bit deallocation vector may be used for deallocating entries of an M-entry shared resource, such as pick queue 400. This deallocation vector may be conveyed to control logic for determining which entries to deallocate in a particular clock cycle. The entry position and number of entries deallocated in a clock cycle may be arbitrary. The assertion of particular bit positions within the M-bit deallocation vector may determine the entry positions within a shared resource to deallocate. A further description of logic for asserting these bit positions for conditions other than a flush is provided below in the discussions of FIG. 9 and FIG. 10.

When a pipeline flush does exist, in one embodiment, an M-bit flush vector may be formed and then combined with the M-bit deallocation vector. Similar to the M-bit deallocation vector, each bit position of the M-bit flush vector may correspond to an entry in a shared resource, such as pick queue 400. Then the bit positions of the M-bit vectors may be combined with the bit positions of the M-bit deallocation vector using binary OR logic. Entries that correspond to asserted bit positions of the M-bit deallocation vector may be deallocated in a clock cycle. Additionally, this method may allow for multiple thread flushes in subsequent cycles. Control logic may be aware of instructions to be flushed that are already issued. Therefore, corresponding flush signals may be conveyed to remove these instructions from the execution units.

In one embodiment, the pick queue 400 may be thread agnostic, or each entry of the pick queue 400 may be configured to be allocated for use in each clock cycle by each of the plurality of threads. A thread ID may not be stored within an entry of the pick queue 400. In such an embodiment, a separate register outside the pick queue 400 may store a corresponding thread ID for each entry of the pick queue 400. This separate register may be accessed during a thread-specific pipeline flush in order to form the M-bit flush vector and deallocate the correct entries. In one embodiment, the trap logic unit 245 may convey a thread ID for a flush for one clock cycle to corresponding components across the chip die. In another embodiment, some components, such as the pick queue 400, may be relied upon to convey subsequent flush signals to components, such as the execution units. Following, control flow of method 700 returns to block 702 via block A.

Figure 8:
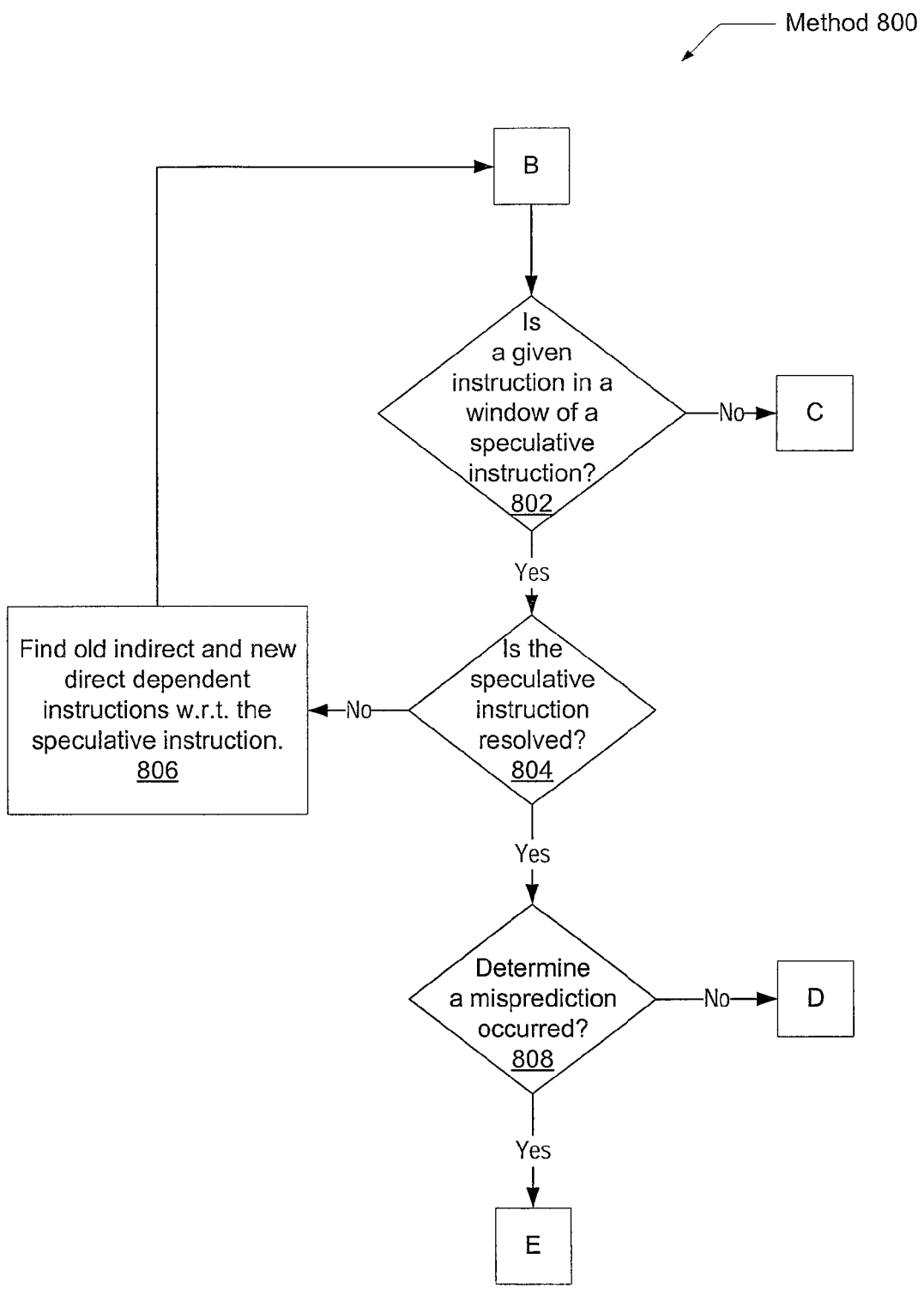
FIG. 8 is a generalized flow diagram illustrating one embodiment of a method for continuing efficient out-of-order dynamic deallocation of instructions from a shared resource in a processor.

Referring now to FIG. 8, one embodiment of a method 800 for continuing efficient out-of-order dynamic deallocation of instructions from a shared storage resource in a processor is shown. For purposes of discussion, the steps in this embodiment and with subsequent embodiments of further methods to be described shortly are shown in sequential order. However, some steps may occur in a different order than shown, some steps may be performed concurrently, some steps may be combined with other steps, and some steps may be absent in another embodiment. A processor core has picked multiple instructions from multiple threads without the presence of a pipeline flush in order to arrive at block B. A particular instruction may be within a window of a speculative instruction if the particular instruction is the speculative instruction, the particular instruction has a data dependency on the speculative instruction, or the particular instruction has a data dependency on an instruction that has a data dependency on the speculative instruction. In one embodiment, a branch instruction in this case may not be considered a speculative instruction. Rather, if a misprediction occurs later for a branch, the trap logic unit 275 may convey an indication to perform a pipeline flush of a corresponding thread. Therefore, method 800 may not determine a branch as a speculative instruction in conditional block 802.

In one embodiment, a speculative instruction may be a load instruction, or any instruction configured to read the data contents of a particular cache line. Such an instruction may experience a d-TLB miss or a data cache miss. By predicting a hit in the cache, a load instruction may be treated as a speculative instruction. In such a case, a known latency may be predicted. Younger instructions, including dependent instructions, may then issue early assuming that the load instruction hits in the cache. However, during a load miss, or misprediction of the speculative load, recovery occurs. During recovery, any younger instructions dependent on the mispredicted load instruction may then re-execute. Also, each store operation within processor core 100 may be considered to be a speculative operation in the sense that a miss to a data translation look-aside buffer (d-TLB) may arise during execution of the store instruction by the LSU 245.

One approach for recovery includes deallocating the younger dependent instructions from the pick queue at the time of their early pick and possible issue before a load miss. Then after a load miss, all younger instructions are re-fetched. While this approach eliminates storing post-pick instructions in the pick queue, performance may suffer due to the overhead associated with re-fetching the instructions.

A second approach maintains storage of all younger instructions in the pick queue 400 until the older load hit status is known. In the case of a load miss, during recovery the younger dependent instructions may subsequently re-issue according to a predetermined policy. As pipeline depth increases, the speculative window of the load instruction increases. Accordingly, the size of the pick queue 400 may increase as the number of instructions in the pick queue 400 waiting to be re-picked increases. These instructions may fill a larger portion of the entries of the pick queue 400 and prevent other younger instructions from being allocated in the pick queue 400. Therefore, quick deallocation of these and other instructions allocated in the pick queue 400 may be desired.

If a given picked instruction is not in a window of a speculative instruction (conditional block 802), then method 800 moves to block C. Otherwise, if the corresponding speculative instruction is not resolved (conditional block 804), such as a load instruction does not yet have its hit/miss status resolved, then in block 806, the identification of direct and indirect dependent instructions is updated. Since entries of the pick queue 400 may be updated (allocated/deallocated) each clock cycle, a dependency matrix may be updated to identify all current instructions both directly depending and indirectly dependent on the speculative instruction, such as a load instruction. Such an update may include repeated binary logic AND-OR reductions on corresponding dependency vectors.

When the speculative instruction is resolved (conditional block 804), such as a load instruction hit/miss status is resolved, a corresponding replay may be unnecessary if no misprediction occurred (conditional block 808), such as the load instruction hit in the data cache. Control flow of method 800 then moves to block D. Otherwise, control flow of method 800 moves to block E.

Figure 9:
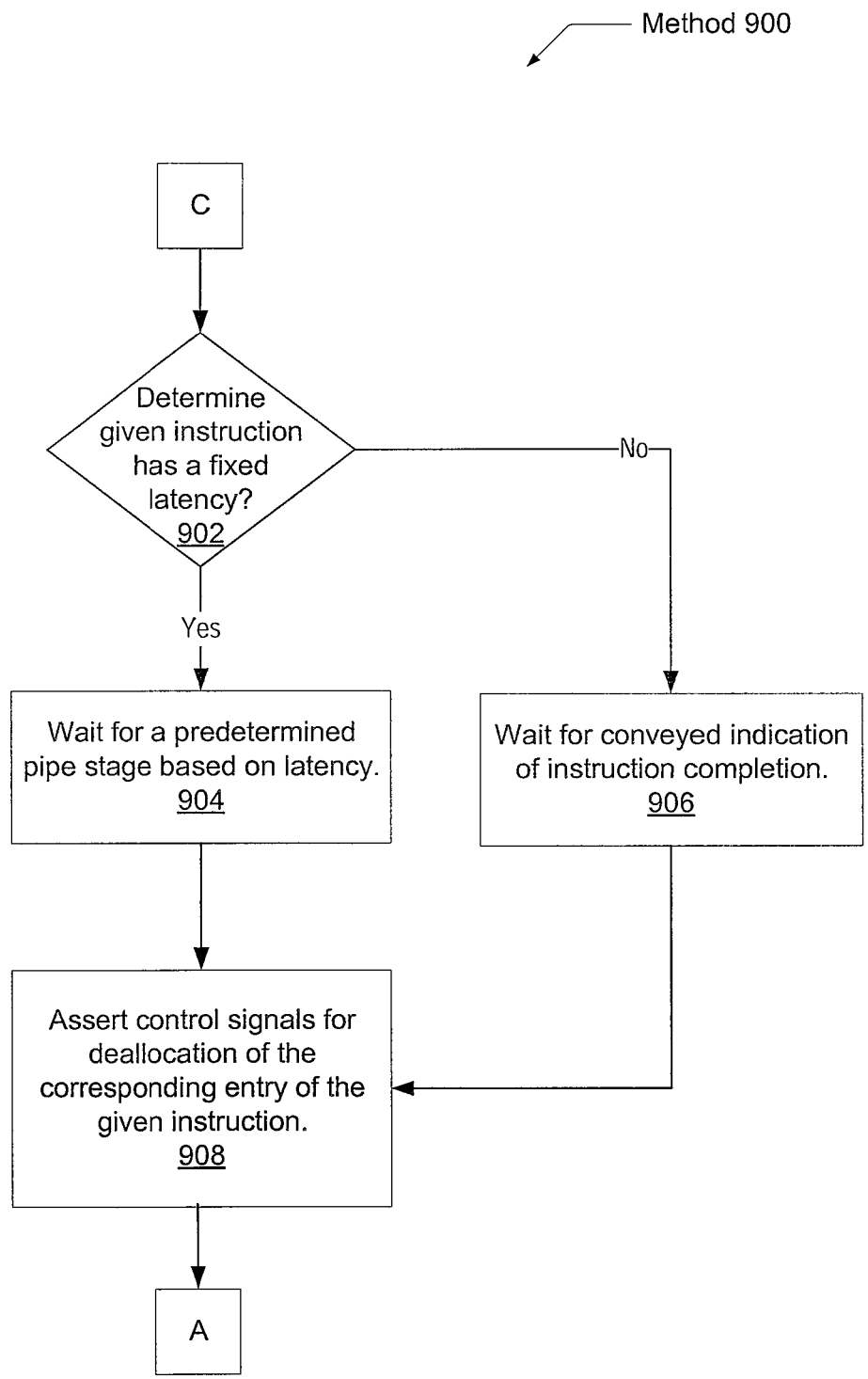
FIG. 9 is a generalized flow diagram illustrating one embodiment of a method for continuing efficient out-of-order dynamic deallocation of instructions from a shared resource in a processor.

Turning now to FIG. 9, one embodiment of a method 900 for continuing efficient out-of-order dynamic deallocation of instructions from a shared storage resource in a processor is shown. As with method 700 and 800, the steps in this embodiment and with subsequent embodiments of further methods to be described shortly are shown in sequential order. However, some steps may occur in a different order than shown, some steps may be performed concurrently, some steps may be combined with other steps, and some steps may be absent in another embodiment. A picked instruction is not within a window of a speculative instruction at block C. If the given instruction has a fixed latency (conditional block 902), then in block 904, the latency may be used to predetermine a pipe stage for deallocation of the given instruction.

In one embodiment, integer arithmetic instructions may have a latency of one clock cycle. For example, referring again to FIG. 2A, an integer arithmetic instruction may be picked in CC 5, may be issued in CC 6, may begin execution in CC 7, and a corresponding result may be available in CC 8. Logic for picking a separate dependent instruction may not wait for a broadcast of this result to qualify the dependent instruction for being picked. Likewise, logic for deallocation may not wait for a broadcast of this result to qualify the integer arithmetic instruction for deallocation from the pick queue.

In block 908, corresponding control signals for deallocation of the picked single cycle integer arithmetic instruction may be combined in CC 5 for conveying a resulting deallocation signal in CC 6. In one embodiment, an M-bit deallocation vector, as described above regarding a pipeline flush in block 714 of FIG. 7, may be formed to deallocate entries from a shared resource, such as the pick queue 400. It is noted the single-cycle integer arithmetic instruction may not yet have been executed in CC 7, but it may already be deallocated in CC 6 from the pick queue 400. Now the corresponding entry in the pick queue 400 is available for allocation by another instruction. By not waiting for a broadcast of a corresponding result of the integer arithmetic instruction in CC 8 to setup a deallocation in CC 9, this method may expedite the operation of subsequent instructions by 3 clock cycles in this example.

It is noted that although this deallocation may be considered early, its timing is such that a younger (in-program-order) dependent instruction may be picked and issued without stalls and receive correct source operands. A younger dependent instruction may now have a corresponding dependency restriction removed to allow it to be picked. This younger dependent instruction with an allocated entry within pick queue 400 may be picked in CC 7 following the deallocation of the integer arithmetic instruction. In one embodiment, a bit position (column position) corresponding to the deallocated instruction may be cleared in a dependency vector corresponding to the younger dependent instruction. This younger dependent instruction may be issued in CC 8, which is the same CC the integer arithmetic instruction may broadcast its results, and may begin execution in CC 9.

If the processor core 100 has a microarchitecture with multi-cycle pipe stages, such as four clock cycles for an issue pipe stage (e.g. I1, I2, I3, I4), then the execute pipe stage may not occur until CC 10. Then this method may still deallocate a single cycle integer arithmetic instruction in CC 6, rather than in CC 11 if control circuitry for deallocation waited for a broadcast of a result of the instruction. This earlier deallocation may be utilized by any single cycle instruction that is not in a window of a speculative instruction. For example, floating-point and graphics instructions without a destination are other examples. System performance may increase due to the quicker deallocation of these instructions, which may provide available entries in the pick queue at an earlier pipe stage for other instructions.

Some floating-point (FP) and cryptographic instructions may have operations performed by pipelined logic. Therefore, these instructions are deterministic similar to the integer arithmetic instructions. Although these FP and cryptographic instructions may have a latency greater than one clock cycle, the above discussion for single cycle latencies still applies. Referring again to FIG. 2A, a pipelined FP or cryptographic instruction may be picked in CC 5, may be issued in CC 6, may begin execution in CC 7, and a corresponding result may be available in CC 10, since these instructions may have a latency of 3 clock cycles. Therefore, logic for deallocation may not wait for a broadcast of this result to qualify the pipelined FP or cyrptographic instruction for deallocation from the pick queue 400.

In block 908, referring again to the example, corresponding control signals for deallocation of the picked multi-cycle FP or cryptographic instruction may be asserted in CC 7 for deallocation in CC 8 due to the 3 clock cycle latency. It is noted the single cycle integer arithmetic instruction may not yet have produced a result in CC 10, but it may already be deallocated in CC 8 from the pick queue 400. Now the corresponding entry in the pick queue 400 is available for allocation by another instruction. By not waiting for a broadcast of a corresponding result of the integer arithmetic instruction in CC 10 to setup a deallocation in CC 11, this method may expedite the operation of subsequent instructions by 3 clock cycles in this example. It is noted that although this deallocation may be considered early, its timing is such that a younger (in-program-order) dependent instruction may be picked and issued without stalls and receive correct source operands. A younger dependent instruction may now have a corresponding dependency restriction removed to allow it to be picked. In one embodiment, a bit position (column position) corresponding to the deallocated instruction may be cleared in a dependency vector corresponding to the younger dependent instruction.

If the processor core 100 has a microarchitecture with multi-cycle pipe stages, such as four clock cycles for an issue pipe stage (e.g. I1, I2, I3, I4), then the execute pipe stage for the above example may not occur until CC 10. Then this method may still deallocate 3-cycle latency FP or cryptographic instruction in CC 8, rather than in CC 14 if control circuitry for deallocation waited for a broadcast of a result of the instruction. This earlier deallocation may be utilized by any 3-cycle latency instruction that is not in a window of a speculative instruction. Again, system performance may increase due to the quicker deallocation of these instructions, which provides an available entry in the pick queue at an earlier pipe stage for other instructions.

In the above example, in one embodiment, the 3-cycle latency FP, graphics, and cryptographic instructions may have a specified integer destination. Such instructions with a specified floating-point destination may have a smaller latency, such as a 2-cycle latency. The benefits of early deallocation as described above for both single cycle and multi-cycle latency instructions may apply to this 2-cycle latency case.

In one embodiment, a speculation mask, or an M-bit vector derived from the M-by-M dependency matrix 440, may be used to determine if a particular instruction is in a window of a speculative instruction. Similarly, M-bit vectors signifying non-memory-access operations and nondeterministic operations may be used in an unmodified form or a complementary form to identify one or more picked deterministic instructions within the pick queue 400 that are not in a window of a speculative instruction. Then each of these instructions may be a candidate for deallocation when a predetermined pipe stage based upon a corresponding latency is reached.

If the given instruction does not have a fixed latency (conditional block 902), then in block 906, an execution unit may convey an indication of operation completion for the given instruction. For example, a floating-point divide instruction may generate a result dependent on the source data. Also, an instruction such as a floating-point divide may not be pipelined, which makes the instruction nondeterministic. When a corresponding indication is received, in block 908, corresponding control signals for deallocation of the given instruction may be asserted. Then control flow of method 900 moves to block A.

Figure 10:
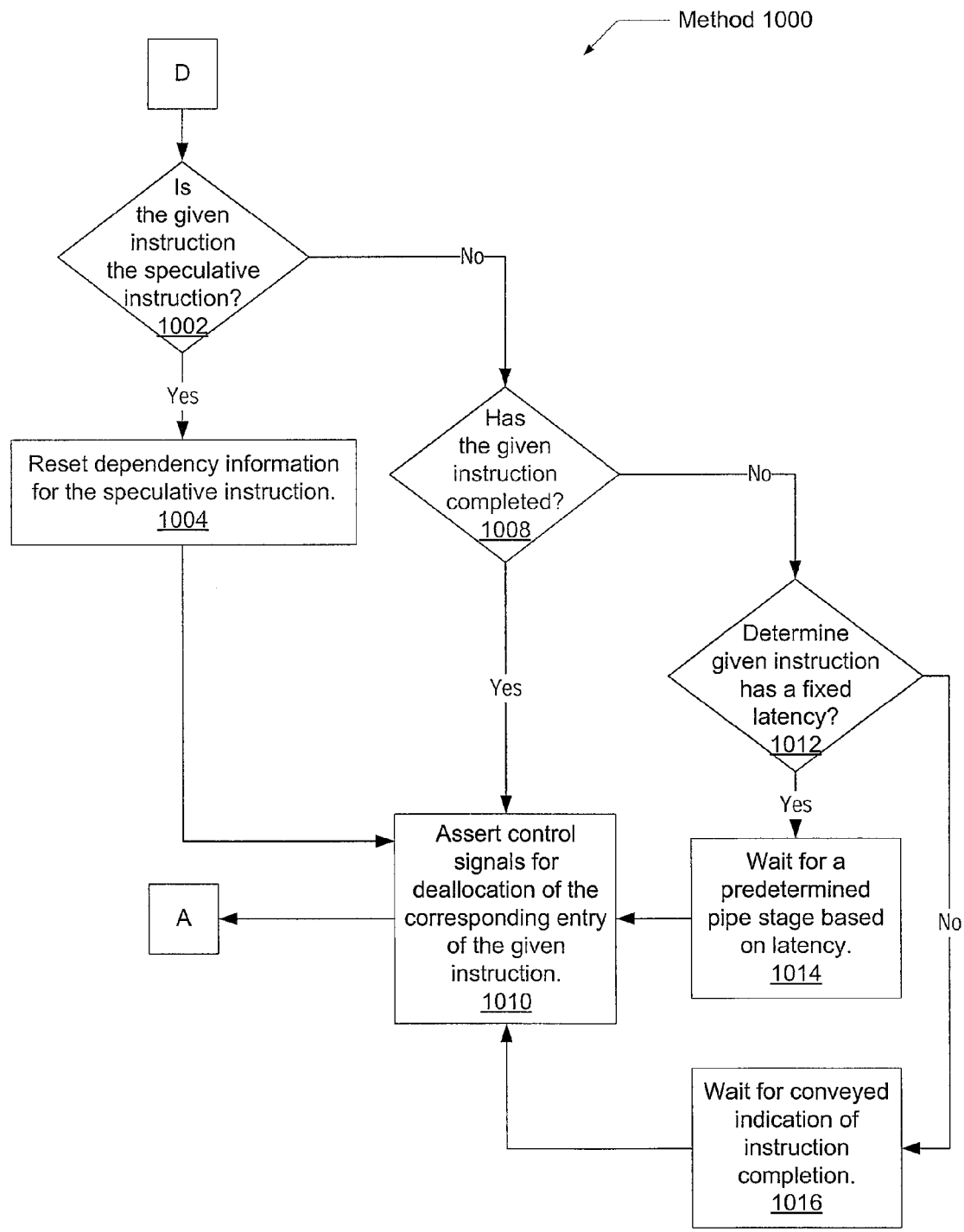
FIG. 10 is a generalized flow diagram illustrating one embodiment of a method for continuing efficient out-of-order dynamic deallocation of instructions from a shared resource in a processor.

Turning now to FIG. 10, one embodiment of a method 1000 for continuing efficient out-of-order dynamic deallocation of instructions from a shared storage resource in a processor is shown. For purposes of discussion, the steps in this embodiment and with subsequent embodiments of further methods to be described shortly are shown in sequential order. However, some steps may occur in a different order than shown, some steps may be performed concurrently, some steps may be combined with other steps, and some steps may be absent in another embodiment. To reach block D, a given instruction is within a window of a speculative instruction that is resolved and did not mispredict.

If the given instruction is in the window by being the speculative instruction itself (conditional block 1002), then in block 1004, the corresponding dependency information may be reset. In one embodiment, a corresponding column in the dependency matrix 440 is cleared. This reset will update corresponding vectors, such as a speculative vector used to track the window of directly and indirectly dependent instructions with respect to the speculative instruction. In block 1010, corresponding control signals for deallocation of the given instruction may be asserted. Then control flow of method 1000 moves to block A. It is noted that deallocation of entries of a shared storage resource, such as the pick queue 400, may be performed by block 714 of FIG. 7, block 908 of FIG. 9, and block 1010 of FIG. 10. In one embodiment, the deallocation performed by each of these blocks may occur simultaneously. Therefore, each entry of the pick queue 400, such as entries 432, 412, and 442 of FIG. 3, may be deallocated simultaneously in a single clock cycle. The deallocation window may be the entire pick queue 400. It is noted that the deallocation window, or the number of entries in the pick queue 400 that may be deallocated in a single clock cycle, is a separate entity from the speculative window described above.

If the given instruction is not in the window by being the speculative instruction itself (conditional block 1002), and the given instruction has completed its operation (conditional block 1008), then control flow of method 1000 moves to block 1010. If the given instruction has not completed its operation (conditional block 1008), and the given instruction has a fixed latency (conditional block 1012), then this latency may be used by logic for deallocation. Similar to the description for blocks 904 and 908 of FIG. 9, in block 1014, a determination may be made by control logic as to when to assert corresponding control signals for deallocation. In one embodiment, this logic may determine these control signals of the given instruction may be asserted in a predetermined first pipe stage earlier than a second pipe that may broadcast a corresponding result. System performance may increase due to the quicker deallocation of this instruction, which provides an available entry in the pick queue at an earlier pipe stage for other instructions. In another embodiment, in order to simplify control circuitry complexity and reduce a timing path, the logic may determine to wait until the given instruction has completed operation. Then control flow of method 1000 moves to block 1010.

Alternatively, if the given instruction has not completed its operation (conditional block 1008), and the given instruction does not have a fixed latency (conditional block 1012), then an execution unit may convey an indication of operation completion for the given instruction. For example, a floating-point divide instruction may generate a result dependent on the source data. Also, this instruction may not be pipelined, which makes the instruction nondeterministic. When a corresponding indication is received, in block 1016, control flow of method 1000 moves to block 1010.

Figure 11:
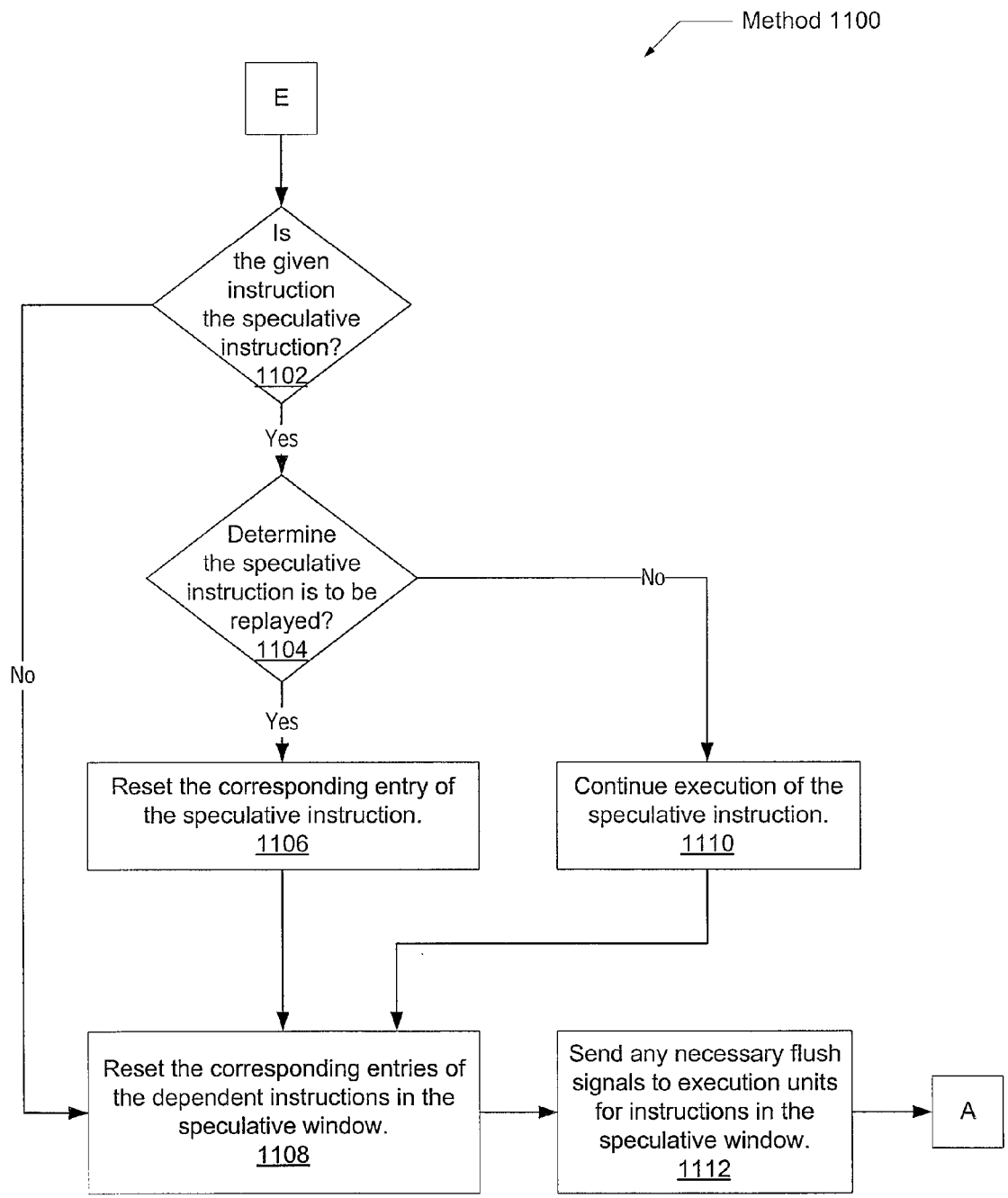
FIG. 11 is a generalized flow diagram illustrating one embodiment of a method for continuing efficient out-of-order dynamic deallocation of instructions from a shared resource in a processor.

Referring now to FIG. 11, one embodiment of a method 1100 for continuing efficient out-of-order dynamic deallocation of instructions from a shared storage resource in a processor is shown. As with the previously described methods, the steps in this embodiment and with subsequent embodiments of further methods to be described shortly are shown in sequential order. However, some steps may occur in a different order than shown, some steps may be performed concurrently, some steps may be combined with other steps, and some steps may be absent in another embodiment.

If the given instruction is in the window by being the speculative instruction itself (conditional block 1102), then a determination is made whether or not to replay the given instruction. One example of a speculative instruction is a load instruction predicted not to miss in the d-TLB or in the data cache and predicted not to experience a RAW data hazard. In one embodiment, if a load instruction misses in the d-TLB or in the data cache, then the load instruction may not replay. Rather, the load instruction may wait for a cache line fill transaction to complete. Concurrently, control logic may convey an indication to instructions dependent on the load instruction to replay.

If the load instruction experiences a RAW hazard, then the load instruction may be replayed. If control logic determines the speculative instruction is to be replayed (conditional block 1104), then in block 1106, corresponding control signals that reset the entry in the pick queue 400 for the speculative instruction may be asserted. For example, the Picked field 424 and Trigger field 426 of the entry may be reset to a binary logic zero value. Now, the speculative instruction may be a candidate to be picked again by selection logic within the pick queue 400. In block 1108, corresponding control signals that reset entries entry in the pick queue 400 for both the directly and indirectly dependent instructions with respect to the speculative instruction may be asserted. For example, again, the Picked field 424 and Trigger field 426 of the entries may be reset to a binary logic zero value.

If control logic determines the speculative instruction is to be replayed (conditional block 1104), then in block 1110, the speculative instruction continues its execution. No update to its entry within the pick queue 400 may be performed. For example, if a load instruction misses in the d-TLB or in the data cache, a misprediction occurs, but the load instruction may not be replayed. Control flow of method 1100 then moves to block 1108. In block 1112, control logic may be aware of directly and indirectly dependent instructions within the window of the speculative instruction that are already issued. Therefore, corresponding flush signals may be sent to remove these instructions from the execution units. As the corresponding entries have already been reset in block 1108, these instructions may be candidates for instruction pick selection logic within the pick queue 400.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A unified microprocessor pick queue comprising:
control circuitry; and
an array comprising a plurality of entries, wherein one or more entries may be allocated for use by any of a plurality of threads each clock cycle;
wherein the control circuitry is configured to:
determine a consumer instruction is dependent on a result of a producer instruction, wherein the producer instruction is allocated in a first entry of the plurality of entries and the consumer instruction is allocated in a second entry of the plurality of entries;
determine the producer instruction has a fixed execution latency;
pick the producer instruction for issue to execution resources in a first clock cycle;
measure an amount of time elapsed since the first clock cycle; and
pick the consumer instruction for issue to execution resources in a second clock cycle based at least in part on determining an amount of time elapsed between the first clock cycle and the second clock cycle equals the fixed execution latency, wherein the second clock cycle is prior to an indication that the producer instruction has completed.

2. The unified pick queue as recited in claim 1, wherein the producer instruction is not dependent on a speculative instruction, and wherein the speculative instruction comprises at least one of the following: a load instruction or a store instruction.

3. The unified pick queue as recited in claim 1, wherein the unified pick queue further comprises a dependency matrix configured to store indications of dependencies between instructions, wherein the circuitry is further configured to pick in the second clock cycle the consumer instruction prior to detecting an indication of a dependency on the producer instruction is cleared.

4. The unified pick queue as recited in claim 1, wherein the circuitry is configured to determine the picked instruction is not dependent on a speculative instruction, in response to determining the picked instruction is dependent on a speculative instruction that has completed without misprediction.

5. The unified pick queue as recited in claim 1, wherein the circuitry is further configured to deallocate the producer instruction from the first entry based on said determining the elapsed time equals the fixed execution latency, which occurs prior to the indication of operation completion of the producer instruction.

6. The unified pick queue as recited in claim 4, wherein the circuitry is further configured to update each clock cycle a M-bit deallocation vector derived from pick status information stored in an M-entry array.

7. The unified pick queue as recited in claim 1, wherein the consumer instruction uses the result of the producer instruction for just-in-time execution based on the pick in the second clock cycle, wherein the just-in-time execution comprises an overlap between the producer instruction producing the result and the picked consumer instruction using the result.

8. The unified pick queue as recited in claim 1, wherein the circuitry is further configured to not reset status information corresponding to the producer instruction, in response to determining the producer instruction is younger than and not dependent on a speculative instruction that has mispredicted.

9. A method comprising:
maintaining an array comprising a plurality of entries, wherein one or more entries may be allocated for use by any of a plurality of threads each clock cycle;
determining a consumer instruction is dependent on a result of a producer instruction, wherein the producer instruction is allocated in a first entry of the plurality of entries and the consumer instruction is allocated in a second entry of the plurality of entries;
determining the producer instruction has a fixed execution latency;
picking the producer instruction for issue to execution resources in a first clock cycle;
measuring an amount of time elapsed since the first clock cycle; and
picking the consumer instruction for issue to execution resources in a second clock cycle based at least in part on determining an amount of time elapsed between the first clock cycle and the second clock cycle equals the fixed execution latency, wherein the second clock cycle is prior to an indication that the producer instruction has completed.

10. The method as recited in claim 9, wherein the producer instruction is not dependent on a speculative instruction, and wherein the speculative instruction comprises at least one of the following: a load instruction and a store instruction.

11. The method as recited in claim 9, wherein the method further comprises:
maintaining a dependency matrix configured to store indications of dependencies between instructions, and
picking in the second clock cycle the consumer instruction prior to detecting an indication of a dependency on the producer instruction is cleared.

12. The method as recited in claim 9, further comprising determining the picked instruction is not dependent on a speculative instruction, in response to determining the picked instruction is dependent on a speculative instruction that has completed without misprediction.

13. The method as recited in claim 9, further comprising deallocating the producer instruction from the first entry based on said determining the elapsed time equals the fixed execution latency, which occurs prior to the indication of operation completion of the producer instruction.

14. The method as recited in claim 12, further comprising updating each clock cycle a M-bit deallocation vector derived from pick status information stored in an M-entry array.

15. The method as recited in claim 12, wherein the consumer instruction uses the result of the producer instruction for just-in-time execution based on the pick in the second clock cycle, wherein the just-in-time execution comprises an overlap between the producer instruction producing the result and the picked consumer instruction using the result.

16. The method as recited in claim 15, further comprising not resetting status information corresponding to the producer instruction, in response to determining the producer instruction is younger than and not dependent on a speculative instruction that has mispredicted.

17. A microprocessor comprising:
an instruction fetch unit configured to fetch instructions corresponding to a plurality of threads;
a rename unit configured to rename the fetched instructions after being decoded; and
a unified pick queue coupled to receive the renamed instructions;

wherein the unified pick queue is further configured to:
  maintain an array comprising a plurality of entries, wherein one or more entries may be allocated for use by any of a plurality of threads each clock cycle;
  determine a consumer instruction is dependent on a result of a producer instruction, wherein the producer instruction is allocated in a first entry of the plurality of entries and the consumer instruction is allocated in a second entry of the plurality of entries;
  determine the producer instruction has a fixed execution latency;
  pick the producer instruction for issue to execution resources in a first clock cycle;
  measure an amount of time elapsed since the first clock cycle; and
  pick the consumer instruction for issue to execution resources in a second clock cycle based at least in part on determining an amount of time elapsed between the first clock cycle and the second clock cycle equals the fixed execution latency, wherein the second clock cycle is prior to an indication that the producer instruction has completed.

18. The microprocessor as recited in claim 17, wherein the pick queue is further configured to determine the picked instruction is not dependent on a speculative instruction, in response to determining the picked instruction is dependent on a speculative instruction that has completed without misprediction.

19. The microprocessor as recited in claim 17, wherein the producer instruction is not dependent on a speculative instruction, and wherein the speculative instruction comprises at least one of the following: a load instruction and a store instruction.

20. The microprocessor as recited in claim 19, wherein the pick queue is further configured to reset status information corresponding to the picked instruction, in response to determining the picked instruction is dependent on a speculative instruction that has mispredicted.

* * * * *